US010127472B2

(12) United States Patent
Enami et al.

(10) Patent No.: US 10,127,472 B2
(45) Date of Patent: Nov. 13, 2018

(54) LIGHT DISTRIBUTION CHARACTERISTIC MEASUREMENT APPARATUS AND LIGHT DISTRIBUTION CHARACTERISTIC MEASUREMENT METHOD

(71) Applicant: Otsuka Electronics Co., Ltd., Osaka (JP)

(72) Inventors: Yoshi Enami, Ritto (JP); Yoshihiko Nishida, Koka (JP)

(73) Assignee: Otsuka Electronics Co., Ltd., Osaka (JP)

( * ) Notice: Subject to any disclaimer, the term of this patent is extended or adjusted under 35 U.S.C. 154(b) by 288 days.

(21) Appl. No.: 15/041,320

(22) Filed: Feb. 11, 2016

(65) Prior Publication Data
US 2016/0239720 A1    Aug. 18, 2016

(30) Foreign Application Priority Data

Feb. 16, 2015 (JP) .................................. 2015-027747

(51) Int. Cl.
G01C 3/08 (2006.01)
G06K 9/46 (2006.01)
(Continued)

(52) U.S. Cl.
CPC .............. *G06K 9/4661* (2013.01); *G01J 1/42* (2013.01); *G06K 9/2036* (2013.01);
(Continued)

(58) Field of Classification Search
CPC ...... G01S 7/484; G01S 7/4861; G01S 7/4865; G01S 7/497; G01S 17/10; G01S 17/42; G01S 7/4802
See application file for complete search history.

(56) References Cited

U.S. PATENT DOCUMENTS

2006/0209312 A1* 9/2006 Shoda ................. H04N 1/3871
358/1.1
(Continued)

FOREIGN PATENT DOCUMENTS

CN    101953153 A    1/2011
CN    103364177 A    10/2013
(Continued)

OTHER PUBLICATIONS

An Office Action mailed by the Japanese Patent Office dated Jul. 24, 2018, which corresponds to Japanese Patent Application No. 2015-027747 and is related to U.S. Appl. No. 15/041,320.
(Continued)

*Primary Examiner* — Samantha K Abraham
(74) *Attorney, Agent, or Firm* — Studebaker & Brackett PC

(57) ABSTRACT

A light distribution characteristic measurement apparatus includes an imaging unit disposed at a predetermined distance from a light source, a movement mechanism that successively changes a positional relation of the imaging unit with respect to the light source, while keeping the distance between the light source and the imaging unit, and a processing module that calculates the light distribution characteristic of the light source. The processing module obtains a plurality of image data taken under a first imaging condition and a plurality of image data taken under a second imaging condition different from the first condition, and determines corrected image information corresponding to a relative position of interest, from first image information corresponding to the relative position of interest included in the image data taken under the first condition and second image information corresponding to the relative position of interest included in the image data taken under the second condition.

10 Claims, 18 Drawing Sheets

(51) Int. Cl.
    *G01J 1/42*     (2006.01)
    *G06T 7/00*     (2017.01)
    *G06K 9/20*     (2006.01)

(52) U.S. Cl.
    CPC ..... *G06T 7/0004* (2013.01); *G01J 2001/4247* (2013.01); *G06T 2207/10016* (2013.01); *G06T 2207/10144* (2013.01)

(56) References Cited

U.S. PATENT DOCUMENTS

| | | | |
|---|---|---|---|
| 2009/0085831 A1* | 4/2009 | Odoi | G02F 1/133524 345/1.3 |
| 2009/0185173 A1 | 7/2009 | Ashdown et al. | |
| 2011/0007185 A1 | 1/2011 | Yonaha et al. | |
| 2012/0002075 A1* | 1/2012 | Yoshizumi | H04N 5/2251 348/229.1 |
| 2013/0265570 A1 | 10/2013 | Enami | |

FOREIGN PATENT DOCUMENTS

| | | |
|---|---|---|
| JP | 2005-109935 A | 4/2005 |
| JP | 2013-217651 A | 10/2013 |
| WO | 2007/140585 A1 | 12/2007 |

OTHER PUBLICATIONS

Mitsunaga, T. and Nayar S. K., "Radiometric Self Calibration", IEEE Proc, Computer Vision and Pattern Recognition, 1999, pp. 380-386.

A Chinese Office Action issued by the State Intellectual Property Office dated Aug. 2, 2018, which corresponds to Japanese Patent Application No. 201610086088.2 and is related to U.S. Appl. No. 15/041,320; with English Translation.

* cited by examiner

FIG.1
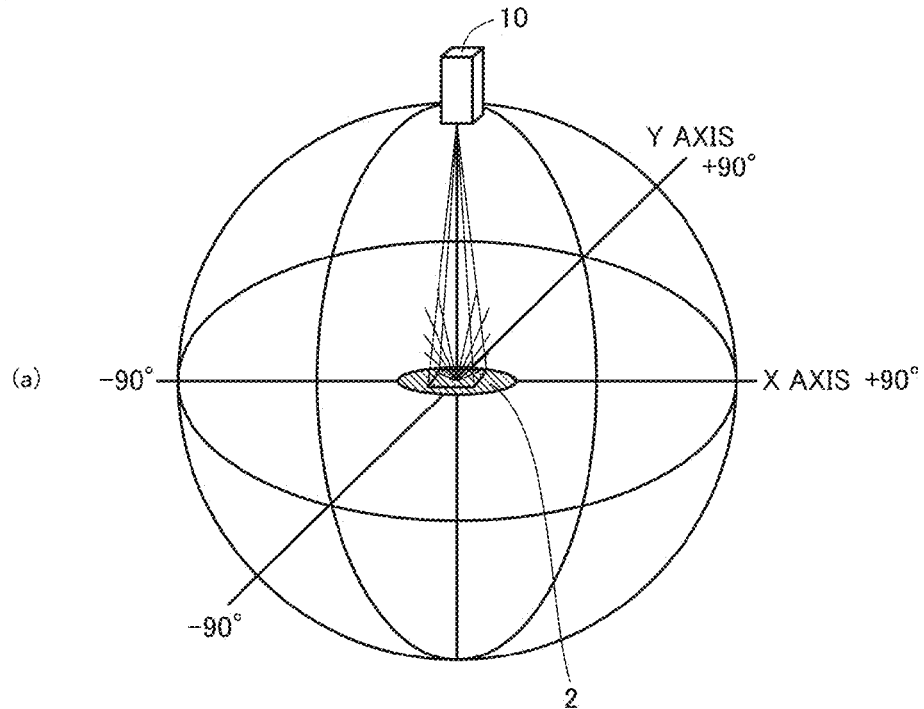
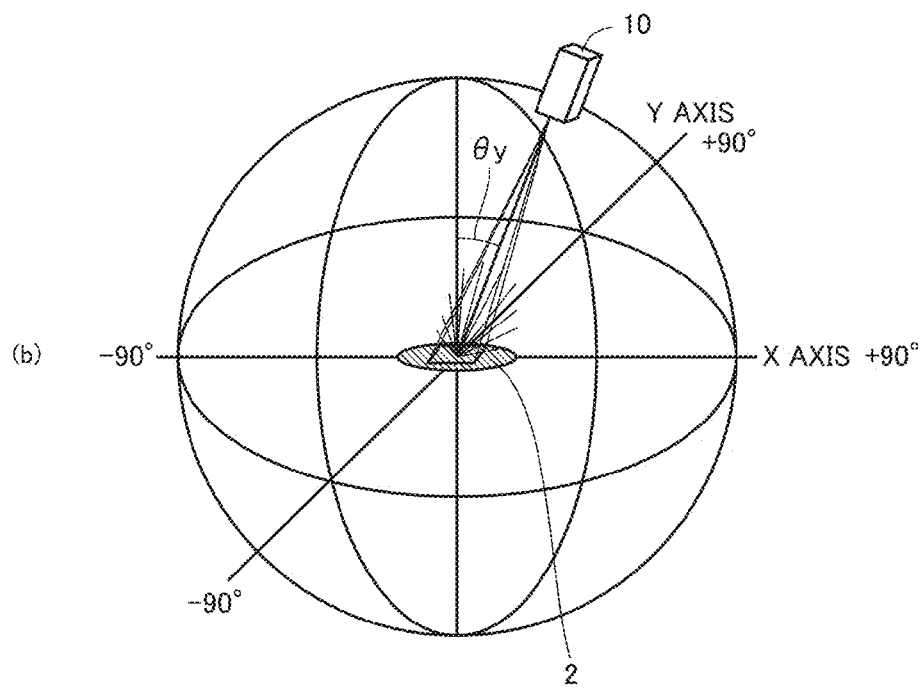

LIGHT DISTRIBUTION CHARACTERISTIC MEASUREMENT APPARATUS AND LIGHT DISTRIBUTION CHARACTERISTIC MEASUREMENT METHOD

BACKGROUND OF THE INVENTION

Field of the Invention

The present invention relates to a light distribution characteristic measurement apparatus and a light distribution characteristic measurement method of measuring the light distribution characteristic of a light source.

Description of the Background Art

The light distribution characteristic is known as one of the characteristics of light emitted from a light source. The light distribution characteristic means a spatial distribution of the luminous intensity (or luminance) of a light source. As the light distribution characteristic, both the absolute-value-based light distribution and the relative-value-based light distribution are used. The absolute-value-based light distribution is a measurement of the spatial distribution of the absolute value of the luminous intensity and is used in such a case where the total luminous flux generated by a light source is to be determined. In contrast, the relative-value-based light distribution is a measurement of the spatial distribution of the relative value of the luminous intensity, and is used in such a case where the light distribution pattern is to be determined. Generally, it is not easy to measure the light distribution characteristic of light sources such as a light source having a complicated light distribution pattern and a light source whose characteristics are not known.

Regarding such measurement of the light distribution, Japanese Patent Laying-Open No. 2013-217651 discloses a light distribution characteristic measurement apparatus capable of efficiently measuring the light distribution characteristic of a light source without increase of the apparatus configuration.

In the case where the light distribution characteristic measurement apparatus disclosed in Japanese Patent Laying-Open No. 2013-217651 is used to measure the surface luminance of a light source, the light distribution characteristic can be measured with a desired precision if the area of a light-emitting portion (bright portion) of the light source to be measured is relatively large and the luminance of the light-emitting portion is measured.

In the case for example where a light source with a strong directivity like headlight of an automobile is to be measured, there is a large difference in luminance between a light-emitting portion (bright portion) and a non-light-emitting portion (dark portion) and therefore, it is not easy to stably measure the luminance of the non-light-emitting portion.

SUMMARY OF THE INVENTION

An object of the present invention is to provide a light distribution characteristic measurement apparatus capable of measuring the light distribution characteristic of a light source with a higher precision even when the light source has a strong directivity, as well as a light distribution characteristic measurement method applied to the light distribution characteristic measurement apparatus.

According to an aspect of the present invention, a light distribution characteristic measurement apparatus for measuring a light distribution characteristic of a light source is provided. The light distribution characteristic measurement apparatus includes: an imaging unit disposed at a predetermined distance from the light source; a movement mechanism configured to successively change a positional relation of the imaging unit with respect to the light source, while keeping the distance between the light source and the imaging unit: and a processing module configured to calculate the light distribution characteristic of the light source, based on a plurality of image data taken by the imaging unit and a relative position of the imaging unit with respect to the light source when each of the plurality of image data is taken. The processing module is configured to obtain a plurality of image data taken under a first imaging condition and a plurality of image data taken under a second imaging condition different from the first imaging condition, and determine corrected image information corresponding to a relative position of interest, from first image information corresponding to the relative position of interest included in the image data taken under the first imaging condition and second image information corresponding to the relative position of interest included in the image data taken under the second imaging condition.

Preferably, imaging under the second imaging condition is performed with a higher imaging sensitivity than an imaging sensitivity with which imaging is performed under the first imaging condition, and the processing module is configured to preferentially use the first image information when the second image information indicates saturation of a pixel value, and otherwise preferentially use the second image information.

Preferably, the processing module is configured to adjust a level of one of the first image information and the second image information, depending on a difference in imaging sensitivity between the first imaging condition and the second imaging condition.

Preferably, the processing module is configured to determine the corrected image information corresponding to the relative position of interest, by averaging the first image information and the second image information.

Preferably, the processing module is configured to calculate image information corresponding to the relative position of interest, from a plurality of image data taken at different positions from the relative position of interest.

According to another aspect of the present invention, a light distribution characteristic measurement method of measuring a light distribution characteristic of a light source is provided. The light distribution characteristic measurement method includes the steps of: successively changing a positional relation of an imaging unit with respect to the light source, while keeping a distance between the light source and the imaging unit; and calculating the light distribution characteristic of the light source, based on a plurality of image data taken by the imaging unit and a relative position of the imaging unit with respect to the light source when each of the plurality of image data is taken. The step of calculating the light distribution characteristic of the light source includes the steps of: obtaining a plurality of image data taken under a first imaging condition and a plurality of image data taken under a second imaging condition different from the first imaging condition; and determining the corrected image information corresponding to a relative position of interest, from first image information corresponding to the relative position of interest included in the image data taken under the first imaging condition and second image information corresponding to the relative position of interest included in the image data taken under the second imaging condition.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a diagram for illustrating a basic measurement scheme for a light distribution characteristic measurement method according to the present embodiment.

DESCRIPTION OF THE PREFERRED EMBODIMENTS

Figure 2:
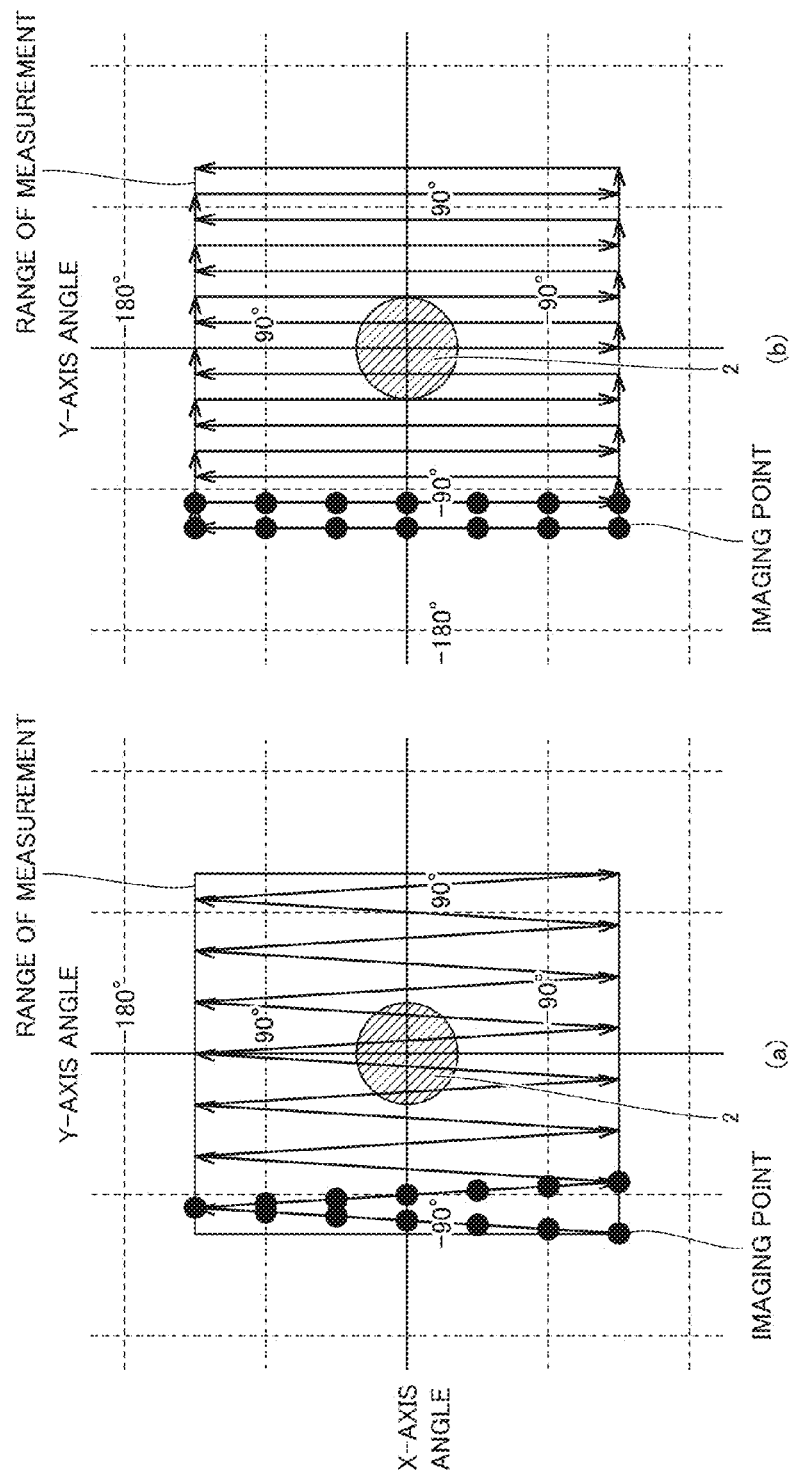
FIG. 2 is a diagram for illustrating a method for moving a camera for a light distribution characteristic measurement method according to the present embodiment.

An embodiment of the present invention will be described in detail with reference to the drawings. In the drawings, the same or corresponding components are denoted by the same reference characters, and a description thereof will not be repeated.

In connection with the present embodiment, a light distribution characteristic measurement apparatus for measuring the light distribution characteristic (typically luminance distribution characteristic) of a light source (hereinafter also referred to simply as "sample") will chiefly be illustrated by way of example. It should be noted that the light distribution characteristic measurement apparatus in the present embodiment is capable of measuring not only the mere light distribution characteristic but also a variety of optical characteristics which are calculated from the light distribution characteristic, such as light source's chromaticity and wavelength information as well as the distribution of illuminance generated by a luminous flux emitted from a light source.

A. OVERVIEW OF LIGHT DISTRIBUTION CHARACTERISTIC MEASUREMENT METHOD

First, an overview of a light distribution characteristic measurement method according to the present embodiment will be described. FIG. 1 is a diagram for illustrating a basic measurement scheme for the light distribution characteristic measurement method according to the present embodiment. As shown in FIG. 1, following the light distribution characteristic measurement method according to the present embodiment, a camera 10 having a predetermined imaging field of view (a kind of two-dimensional sensor) is used to measure a sample 2 at a predetermined range of solid angle to thereby obtain a light distribution characteristic of a light emission surface of sample 2. The obtained light distribution characteristic typically means a luminance distribution characteristic, and includes information about the luminance for each illumination angle (hereinafter also referred to as "measurement angle") at each point (hereinafter also referred to as "measurement point") on the light emission surface of sample 2.

As shown by (a) of FIG. 1, the state in which the optical axis direction of camera 10 is perpendicular to the light emission surface of sample 2 is also referred to as "initial state" hereinafter. For the sake of convenience, with respect to an image taken by camera 10, the side-to-side direction is defined as X axis and the top-to-bottom direction is defined as Y axis. In the initial state, the X-axis angle=0° and the Y-axis angle=0°. Typically, the light distribution characteristic of the light emission surface of sample 2 is obtained by imaging sample 2 with camera 10 while moving camera 10 in a range of ±180° relative to each of the X axis and the Y axis.

In the state shown by (a) of FIG. 1, chiefly a luminous flux (a part of the total luminous flux) applied in the direction perpendicular to a light emission surface of sample 2 enters camera 10 and, in the state shown by (b) of FIG. 1, a luminous flux (a part of the total luminous flux) applied in the direction from the light emission surface of sample 2 toward the position of camera 10 enters camera 10. As shown by (b) of FIG. 1, when camera 10 moves on the Y axis by an angle θy, the angle formed between the direction of camera 10 and the initial direction is determined by adding angle θy on the Y axis to the initial state (X-axis angle=0°, Y-axis angle=0°). Namely, in the example shown by (b) of FIG. 1, the luminance at a measurement point with a measurement angle where X-axis angle=0° and Y-axis angle=θy can be measured.

Following this, the angle (solid angle) of camera 10 relative to sample 2 is changed successively and accordingly sample 2 is imaged successively. In this way, the light distribution characteristic across measurement points can be obtained.

FIG. 2 is a diagram for illustrating a method for moving camera 10 for a light distribution characteristic measurement method according to the present embodiment. As an example of the method for moving the camera, (a) of FIG. 2 shows a system for simultaneously making a movement in the X-axis direction and a movement in the Y-axis direction (two-axis simultaneous driving system), and (b) of FIG. 2 shows a system for independently making each of a movement in the X-axis direction and a movement in the Y-axis direction (single-axis independent driving system).

As shown in FIG. 2, required image data is obtained by periodically or non-periodically and successively imaging a range of a field of view including sample 2, while moving camera 10. The position of camera 10 where this image data is obtained is also referred to as "imaging point" hereinafter.

Regarding the two-axis simultaneous driving system shown by (a) of FIG. 2, there is no stoppage in the Y-axis direction, which provides an advantage that the state in which the camera shakes upon stoppage can be avoided, as well as an advantage that the time required for the whole measurement can be shortened. It should be noted that the angular intervals on the Y axis between imaging points are not identical to each other, and therefore, it is necessary to perform preprocessing so that an error due to the different angular intervals does not occur.

Regarding the single-axis independent driving system shown by (b) of FIG. 2, the camera is caused to shake upon stoppage of movement in the Y-axis direction. Therefore, it is necessary to take measures so that there is no influence of the error caused by this shake. Meanwhile, the intervals with respect to the Y axis between points where images are taken can be made identical to each other, and thus operational processing can be simplified.

In accordance with the light distribution characteristic measurement method of the present embodiment, the light distribution characteristic of a light source is measured with a higher precision, even when the light source has a strong directivity. Namely, for the light distribution characteristic measurement method, a process is employed for appropriately measuring both the luminance of a light-emitting portion (bright portion) and the luminance of a non-light-emitting portion (dark portion) of a light source having a strong directivity like a headlight of an automobile, for example. More specifically, the same sample 2 is imaged under different imaging conditions, and respective image data obtained through this imaging are used to obtain more luminance information about sample 2. The different imaging conditions can be provided to expand the range of luminance (dynamic range) that can be imaged, and accordingly the S/N (Signal to Noise) ratio in the image data can be improved. Namely, the S/N ratio can be improved to more accurately measure the luminance of both a light-emitting portion (bright portion) and a non-light-emitting portion (dark portion).

The imaging conditions typically include the imaging sensitivity of camera 10. The imaging sensitivity can appropriately be adjusted depending on the exposure time, the F-number of camera 10, the gain, whether a neutral density filter is present or not, the type of the neutral density filter, for example.

Figure 3:
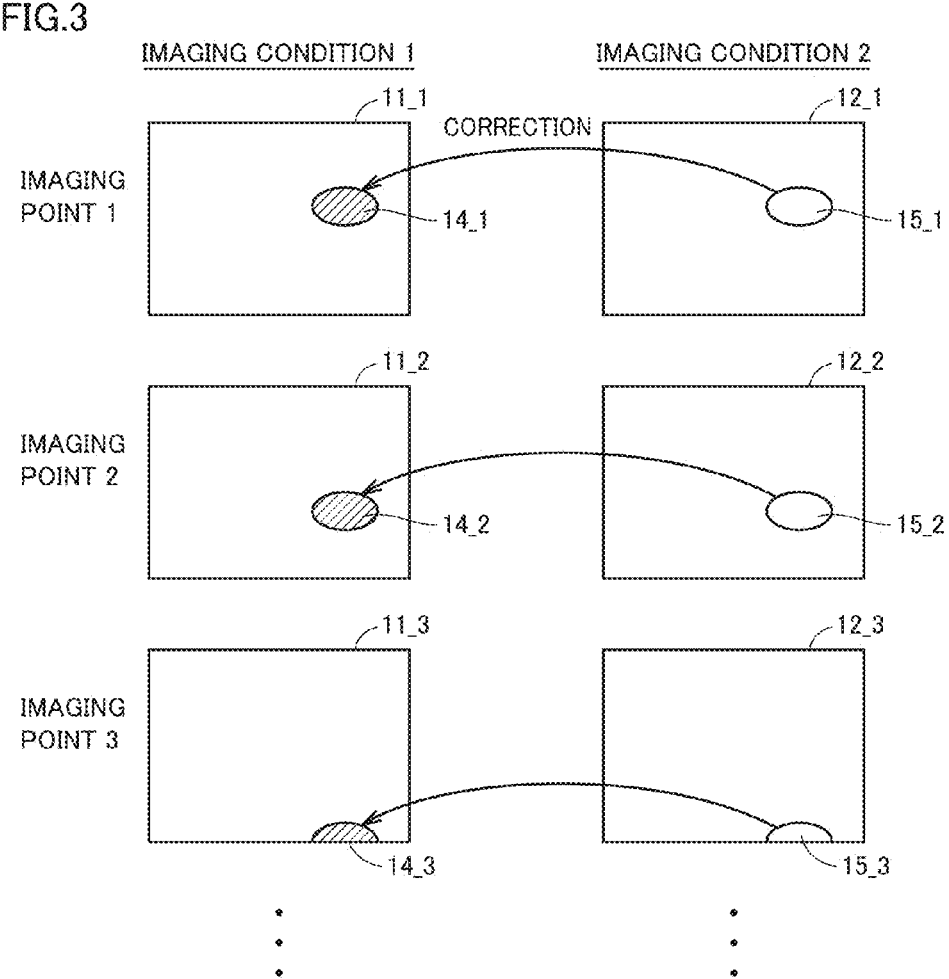
FIG. 3 is a diagram for illustrating an overview of a light distribution characteristic measurement method according to the present embodiment.

FIG. 3 is a diagram for illustrating an overview of a light distribution characteristic measurement method according to the present embodiment. Regarding the example shown in FIG. 3, the example is shown, for the sake of convenience of description, where camera 10 is moved along the same path and imaging is performed at the same imaging point under each of imaging condition 1 and imaging condition 2. Namely, it is supposed that, at imaging point 1, sample 2 is imaged under imaging condition 1 to obtain image data 11_1 and sample 2 is imaged under imaging condition 2 to obtain image data 12_1. Likewise, it is supposed that, at imaging point 2, sample 2 is imaged under imaging condition 1 to obtain image data 11_2 and sample 2 is imaged under imaging condition 2 to obtain image data 12_2 and, at imaging point 3, sample 2 is imaged under imaging condition 1 to obtain image data 11_3 and sample 2 is imaged under imaging condition 2 to obtain image data 12_3.

It is supposed for example that under imaging condition 1, the range of luminance that can be measured is relatively high, namely the imaging sensitivity is low, as compared with imaging condition 2. Therefore, generally imaging condition 1 is suitable for measurement of a light-emitting portion (bright portion) of sample 2 (light source) and imaging condition 2 is suitable for measurement of a non-light-emitting portion (dark portion) of sample 2.

As shown in FIG. 3, in image data 12_1 obtained under imaging condition 2, image information about region 15_1 where its pixel value is not saturated is used to correct corresponding region 14_1 of image data 11_1 obtained under imaging condition 1. A similar process is performed between image data 11_2 (region 14_2) and image data 12_2 (region 15_2), and between image data 11_3 (region 14_3) and image data 12_3 (region 15_3). Such a correction process can be used to measure, with a higher precision, the luminance of a light-emitting portion (bright portion) and a non-light-emitting portion (dark portion) of sample 2.

In the aforementioned correction process, the imaging sensitivity under imaging condition 1 differs from the imaging sensitivity under imaging condition 2, and therefore, the magnitude of luminance indicated by a pixel value of the data under imaging condition 1 is not identical to the magnitude of luminance indicated by the same pixel value of the data under imaging condition 2. Therefore, when the correction process is performed between image data, a conversion process for making a correction for the difference in imaging sensitivity is performed first and then a pixel value on one image data is assigned to a corresponding pixel value of the other image data. Details of the correction process will be described later herein.

While FIG. 3 shows an example where sample 2 is imaged under two imaging conditions, this example is not given by way of limitation. Sample 2 may be imaged more number of times under more imaging conditions. Further, while FIG. 3 shows an example where the same imaging point is set for these imaging conditions, the imaging point may not necessarily be the same imaging point. An example process where different imaging points are set under respective imaging conditions will be described later herein.

B. CONFIGURATION OF LIGHT DISTRIBUTION CHARACTERISTIC MEASUREMENT APPARATUS

Next, a description will be given of a configuration of a light distribution characteristic measurement apparatus according to the present embodiment. The light distribution characteristic measurement apparatus according to the present embodiment includes camera 10 (imaging unit) disposed at a predetermined distance from sample 2, and a movement mechanism successively changing a positional relation (relative relation) of camera 10 with respect to sample 2 while keeping the distance between sample 2 and camera 10. The movement mechanism is capable of changing the relative relation between sample 2 and camera 10 in two different axial directions (X-axis direction and Y-axis direction in the following example) independently of each other.

As a configuration for changing the relative relation between camera 10 and sample 2, there are an imaging-unit moving type for rotationally moving camera 10 while keeping sample 2 stationary, and a light-source moving type for rotationally moving sample 2 while keeping camera 10 stationary. In the following, the imaging-unit moving type is given as an example and its configuration and the like will be described. It should be noted that the present invention may also be implemented by means of the configuration of the light-source moving type.

Figure 4:
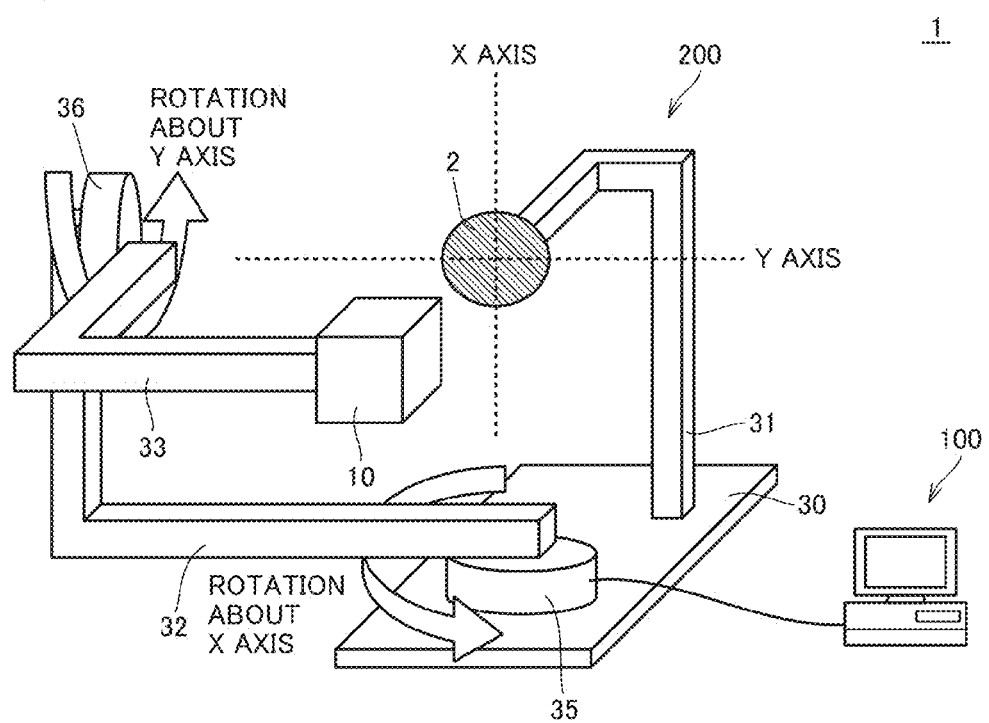
FIG. 4 is a schematic diagram showing an external view of a configuration of a light distribution characteristic measurement apparatus according to the present embodiment.

FIG. 4 is a schematic diagram showing an external view of a configuration of light distribution characteristic measurement apparatus 1 according to the present embodiment. Referring to FIG. 4, light distribution characteristic measurement apparatus 1 includes a goniometer 200 (movement mechanism) rotationally moving camera 10 around sample 2, and an information processor 100 controlling the rotational movement of camera 10 by goniometer 200 and processing image data taken by camera 10.

Goniometer 200 includes a base 30, camera 10, an imaging-unit support arm 33 supporting camera 10, a Y-axis motor 36 rotating imaging-unit support arm 33, an X-axis rotational arm 32 having one end connected to Y-axis motor 36 and rotated by an X-axis motor 35, and X-axis motor 35 disposed on base 30. At the intersection between the rotational axis of X-axis motor 35 and the rotational axis of Y-axis motor 36, camera 10 is disposed. Rotation of X-axis motor 35 and rotational drive of Y-axis motor 36 cause camera 10 to freely revolve around the X-axis and the Y-axis. The position of sample 2 is kept at the intersection between the X axis and the Y axis. Accordingly, the relative relation between sample 2 and camera 10 is freely changed.

Camera 10 typically has a two-dimensional sensor such as CCD (Charge-Coupled Device) image sensor or CMOS (Complementary Metal Oxide Semiconductor) image sensor.

Figure 5:
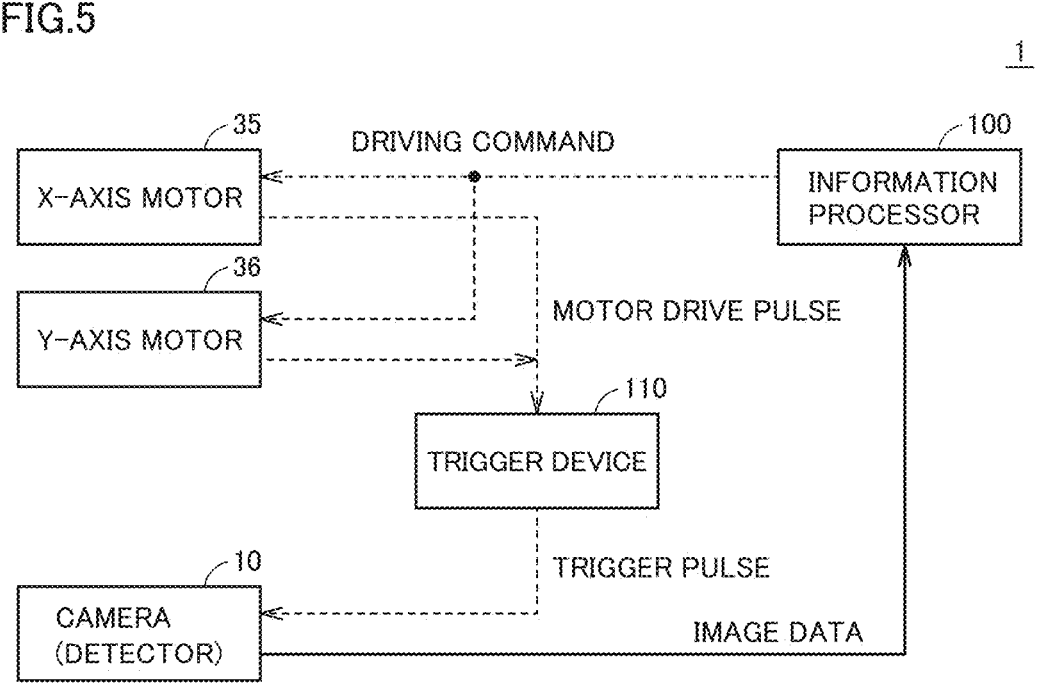
FIG. 5 is a schematic diagram showing a configuration involved in rotational drive of a camera in a light distribution characteristic measurement apparatus according to the present embodiment.

FIG. 5 is a schematic diagram showing a configuration involved in rotational drive of the camera in light distribution characteristic measurement apparatus 1 according to the present embodiment. Referring to FIG. 5, light distribution characteristic measurement apparatus 1 according to the present embodiment further includes a trigger device 110 in addition to the components shown in FIG. 4.

Trigger device 110 manages the imaging timing (imaging point shown in FIG. 2) at which imaging is performed by camera 10, in accordance with a change, made by goniometer 200, of the relative relation between sample 2 and camera 10. The function of trigger device 110 may be implemented by information processor 100. For the sake of more correctly controlling the imaging timing (imaging point), it is preferable to dispose trigger device 110 including a dedicated hardware circuit, separately from information processor 100.

Information processor 100 outputs a driving command to each of X-axis motor 35 and Y-axis motor 36. This driving command includes the speed at which the X-axis motor and the Y-axis motor are moved and/or a target position, for example. In the present embodiment, it is necessary to take a measurement across the whole spherical surface/hemispherical surface centered at sample 2, and therefore, the driving command includes an instruction to repeat a reciprocal motion relative to the X-axis until a series of movements relative to the Y-axis is completed. Information processor 100 outputs the driving command at a transmission start timing. Receiving the driving command, the X-axis motor and the Y-axis motor (as well as motor drivers driving the X-axis motor and the Y-axis motor) each start moving. The X-axis motor and the Y-axis motor each output to trigger device 110 a motor drive pulse representing a rotational amount.

Trigger device 110 divides the received motor drive pulse by a predetermined number to calculate the current position (angle) along the X axis and the Y axis and also outputs, at the angular intervals corresponding to predetermined measurement points, a trigger pulse to camera 10 for instructing the camera to perform imaging.

Receiving the trigger pulse from trigger device 110, camera 10 performs imaging and outputs to information processor 100 image data obtained through this imaging. Each time camera 10 receives the trigger pulse from trigger device 110, camera 10 repeats imaging and transmission of the image data. Based on the order in which image data are taken, information processor 100 identifies an imaging point (solid angle or the like) where the imaging is done. Based on a plurality of image data taken by camera 10 and a relative position of camera 10 with respect to sample 2 when each of the plurality of image data is taken, information processor 100 calculates the light distribution characteristic of sample 2. A process of calculating the light distribution characteristic of sample 2 will be described later herein.

Figure 6:
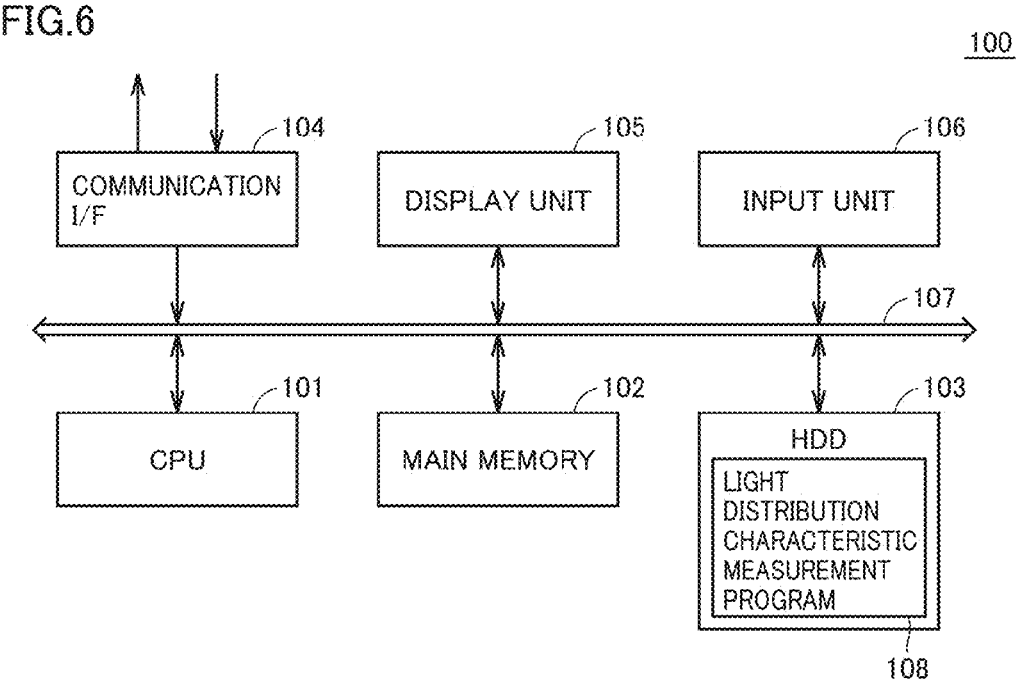
FIG. 6 is a schematic diagram showing an internal configuration of an information processor shown in FIG. 4.

FIG. 6 is a schematic diagram showing an internal configuration of information processor 100 shown in FIG. 4. Referring to FIG. 6, information processor 100 is typically configured of a general-purpose personal computer. More specifically, referring to FIG. 6, information processor 100 includes a CPU (Central Processing Unit) 101, a main memory 102, an HDD (Hard Disk Drive) 103, a communication interface (I/F) 104, a display 105, and an input unit 106. These components are connected to each other via a bus 107 so that they can communicate with each other.

CPU 101 is a processor which executes a light distribution characteristic measurement program 108 stored in HDD 103 for example to thereby implement functions of the present embodiment. Main memory 102 provides a working area necessary for CPU 101 to execute the program. In this working area, temporary data necessary for execution of the program and image data obtained through imaging by camera 10, for example, are stored. HDD 103 stores in a non-volatile manner light distribution characteristic measurement program 108 executed by CPU 101 and parameters necessary for execution of processing, for example.

In HDD 103, light distribution characteristic measurement program 108 to be executed by CPU 101 is installed in advance. For installation of light distribution characteristic measurement program 108, a variety of methods may be employed. For example, a method according to which a program stored in any of a variety of recording media such as CD-ROM (Compact Disk Read Only Memory) or DVD (Digital Versatile Disk) is read by an associated device and stored in HDD 103, or a method according to which the program is downloaded via a network, for example, may be employed.

Communication interface 104 communicates data with other devices. Specifically, communication interface 104 outputs the driving command to each of X-axis motor 35 and Y-axis motor 36 and receives image data obtained through imaging by camera 10.

Display 105 displays the image data obtained through imaging as well as the result of measurement. Specifically, display 105 is configured of an LCD (Liquid Crystal Display) or the like. Input unit 106 accepts operation by a measurer. Specifically, input unit 106 is configured of a mouse, a keyboard, and the like. To information processor 100, another output device such as printer may be connected as required.

A variety of functions of the present embodiment may be implemented entirely or partially by means of a dedicated processor or IC (Integrated Circuit), for example, instead of implemented by being provided through execution of a program by CPU 101. Instead, it may be implemented by means of a dedicated LSI (Large Scale Integration).

C. PROCESS PROCEDURE OF LIGHT DISTRIBUTION CHARACTERISTIC MEASUREMENT METHOD

Figure 7:
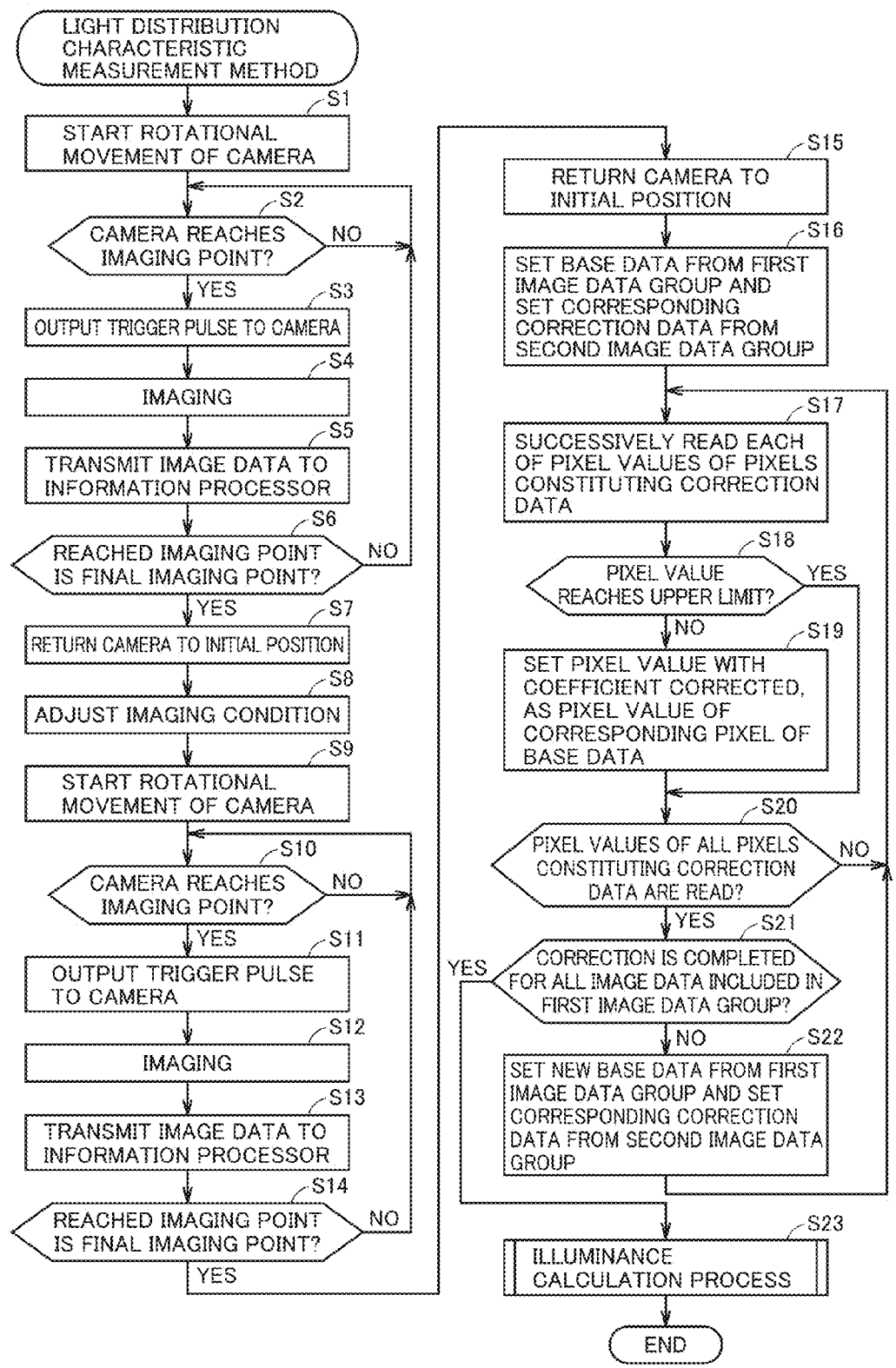
FIG. 7 is a flowchart showing a process procedure of a light distribution characteristic measurement method according to the present embodiment.

Next, a description will be given of a process procedure of a light distribution characteristic measurement method according to the present embodiment. FIG. 7 is a flowchart showing a process procedure of a light distribution characteristic measurement method according to the present embodiment. Each step shown in FIG. 7 is mainly performed by CPU 101 of information processor 100 and trigger device 110. For preparation, a measurer appropriately adjusts the imaging sensitivity (namely imaging condition) such as F-number of camera 10, gain, whether a neutral density filter is present or not, the type of the neutral density filter, for example, depending on a light-emitting portion (bright portion) of sample 2 to be measured. An imaging condition when the process procedure shown in FIG. 7 is started is herein referred to as "imaging condition 1" for the sake of convenience.

Referring to FIG. 7, in response to an instruction to start measurement, CPU 101 of information processor 100 outputs a driving command to each of X-axis motor 35 and Y-axis motor 36 to start rotational movement of camera 10 (step S1). In step S1, CPU 101 generates and outputs the driving command so as to cause camera 10 to move along an orbit as shown in FIG. 2. Namely, CPU 101 successively changes the positional relation of camera 10 with respect to sample 2 while keeping the distance between sample 2 and camera 10.

Subsequently, trigger device 110 determines whether or not camera 10 has reached a predetermined imaging point (step S2). More specifically, trigger device 110 counts each of a motor drive pulse from X-axis motor 35 and a motor drive pulse from Y-axis motor 36, and determines whether or not each count value of the pulse meets a condition representing the imaging point. When camera 10 has not reached the predetermined imaging point (NO in step S2), the process is repeated from step S2.

When camera 10 has reached the predetermined imaging point (YES in step S2), trigger device 110 outputs a trigger pulse to camera 10 (step S3). Receiving the trigger pulse, camera 10 perform imaging (step S4), and transmits image data obtained through the imaging to information processor 100 (step S5).

Subsequently, trigger device 110 determines whether or not the imaging point where camera 10 has reached is the final imaging point (step S6). More specifically, trigger device 110 counts each of the motor drive pulse from X-axis motor 35 and the motor drive pulse from Y-axis motor 36 and determines whether or not each count value of the motor drive pulse meets a condition representing the final imaging point. When the imaging point where camera 10 has reached is not the final imaging point (NO in step S6), the process is repeated from step S2.

When the imaging point where camera 10 has reached is the final imaging point (YES in step S6), CPU 101 of information processor 100 outputs the driving command to each of X-axis motor 35 and Y-axis motor 36 to return camera 10 to the initial position (step S7). Then, the rotational movement of camera 10 is temporarily stopped. At this time, a group of image data obtained at corresponding imaging points under imaging condition 1 is stored in information processor 100. The group of image data obtained under imaging condition 1 is herein referred to as "first image data group" for the sake of convenience.

Here, the measurer appropriately adjusts the imaging sensitivity (namely imaging condition) such as F-number of camera 10, gain, whether a neutral density filter is present or not, the type of the neutral density filter, for example, so as to enhance the imaging sensitivity of camera 10 (step S8). An imaging condition after this adjustment is herein referred to as "imaging condition 2" for the sake of convenience. When the measurer gives an instruction to restart the measurement, subsequent steps S9 to S15 are performed. The process from step S9 to S15 is similar to the process from step S1 to S7.

Namely, when the instruction to restart the measurement is given, CPU 101 of information processor 100 outputs the driving command to each of X-axis motor 35 and Y-axis motor 36 to start rotational movement of camera 10 (step S9). Subsequently, trigger device 110 determines whether or not camera 10 has reached a predetermined imaging point (step S10). When camera 10 has not reached the predetermined imaging point (NO in step S10), the process is repeated from step S10.

When camera 10 has reached the predetermined imaging point (YES in step S10), trigger device 110 outputs the trigger pulse to camera 10 (step S11). Receiving the trigger pulse, camera 10 performs imaging (step S12), and transmits image data obtained through the imaging to information processor 100 (step S13).

Subsequently, trigger device 110 determines whether or not the imaging point where camera 10 has reached is the final imaging point (step S14). When the imaging point where camera 10 has reached is not the final imaging point (NO in step S14), the process is repeated from step S10.

When the imaging point where camera 10 has reached is the final imaging point (YES in step S14), CPU 101 of information processor 100 outputs the driving command to each of X-axis motor 35 and Y-axis motor 36 to return camera 10 to the initial position (step S15). Then, the rotational movement of camera 10 is temporarily stopped. At this time, a group of image data obtained at corresponding imaging points under imaging condition 2 is stored in information processor 100. The group of image data obtained under imaging condition 2 is herein referred to as "second image data group" for the sake of convenience.

When the first and second image data groups are obtained through the above-described procedure, information processor 100 performs a correction process using these image data groups. Namely, information processor 100 obtains a plurality of image data (first image data group) taken under the first imaging condition, and obtains a plurality of image data (second image data group) taken under the second imaging condition different from the first imaging condition, and determines corrected image information corresponding to each imaging point (relative position of interest), from a pixel value (first image information) corresponding to each imaging point (relative position of interest) included in the image data taken under the first imaging condition and a pixel value (second image information) corresponding to each imaging point (relative position of interest) included in the image data taken under the second imaging condition.

As the correction process, any of a variety of methods may be employed. In the present embodiment, a method is employed according to which each image data in the first image data group is set as base data, and information about the corresponding image data in the second image data group is used to correct the base data.

More specifically, CPU 101 of information processor 100 selects target image data from the first image data group and sets the selected image data as base data, and also sets, as correction data, the corresponding image data (namely the image data taken at the same imaging point under a different imaging condition) of the second image data group (step S16). Namely, from the first image data group and the second image data group, a pair of image data taken at the same imaging point is selected.

Subsequently, CPU 101 successively reads each of pixel values of pixels constituting the correction data (step S17), and determines whether or not the read pixel value reaches an upper limit value (step S18). Namely, CPU 101 determines whether or not the pixel value is saturated. When the read pixel value does not reach the upper limit value (NO in step S18), the read pixel value is multiplied by a coefficient corresponding to a difference in sensitivity and the resultant product (pixel value after corrected by the coefficient) is set as a pixel value of a pixel at the corresponding position in base data (step S19). Namely, the pixel value in the correction data that does not reach the upper limit value is used to update the pixel value of the pixel at the corresponding position in the base data.

When the read pixel value reaches the upper limit value (YES in step S18), the operation in step S19 is skipped.

Subsequently, it is determined whether or not pixel values of all pixels constituting the target correction data have been read (step S20). When any pixel value of a constituent pixel of the target correction data has not been read (NO in step S20), the process is repeated from step S17.

When pixel values of all pixels constituting the target correction data have been read (YES in step S20), this means that the correction process for the target pair of image data has been completed. In this case, CPU 101 determines whether or not the correction process has been completed for all image data included in the obtained first image data group (step S21).

When the correction process for any of the image data included in the obtained first image data group has not been completed (NO in step S21), CPU 101 selects target image data from the first image data group and sets the selected image data as new base data, and sets, as correction data, corresponding image data in the second image data group (step S22). Then, the process is repeated from step S17.

When the correction process has been completed for all image data included in the obtained first image data group (YES in step S21), CPU 101 performs an illuminance calculation process (step S23). When a process result of the illuminance calculation process is output, the process ends.

The above-described process from step S17 to step S19 is expressed by formulas as follows. Namely, it is supposed that a pixel value of base data selected from the first image data group is P1 (x, y), and a pixel value of correction data selected from the second image data group is P2 (x, y). First, as shown by formula (1), it is determined whether or not a pixel value at coordinates (x, y) in the correction data reaches an upper limit value UL (upper limit (255 for example) of the pixel grayscale).

$$\text{pixel value } P2(x,y) \geq \text{upper limit value UL} \quad (1)$$

When formula (1) is not met, namely the pixel value of the correction data is not saturated, the pixel value at coordinates (x, y) in the base data is replaced with the value determined by multiplying the pixel value at corresponding coordinates (x, y) in the correction data, by coefficient α depending on a difference in sensitivity.

$$\text{pixel value } P1(x,y) \leftarrow \alpha \times \text{pixel value } P2(x,y) \quad (2)$$

When formula (1) is met, namely the pixel value of the correction data is saturated, replacement of the pixel value is not done. The process expressed by formula (1) and formula (2) is performed on all pixels constituting the correction data, and accordingly image data without saturated pixel values can be obtained.

Figure 8:
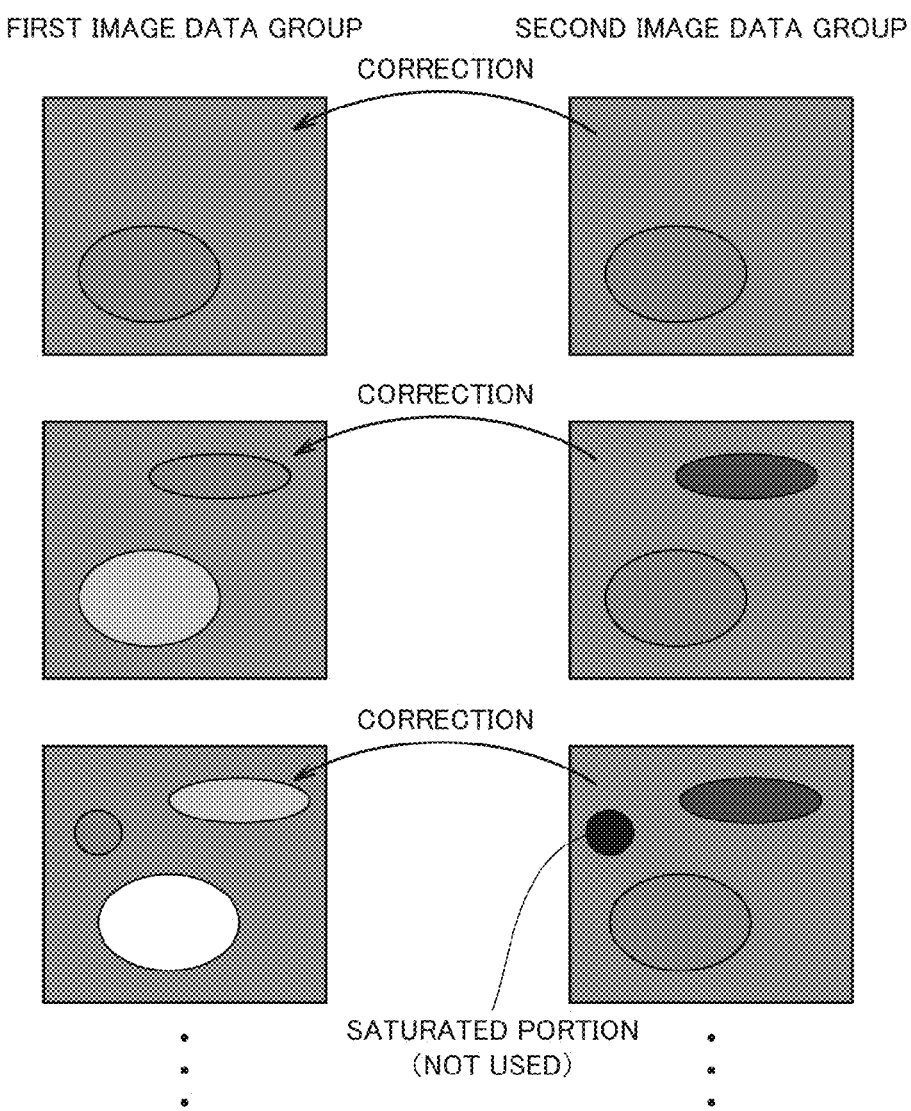
FIG. 8 is a schematic diagram showing details of a correction process by a light distribution characteristic measurement method according to the present embodiment.

FIG. 8 is a schematic diagram showing details of the correction process by a light distribution characteristic measurement method according to the present embodiment. Referring to FIG. 8, the first image data group and the second image data group are used to correct a pixel value based on a pair of image data associated with each other. It should be noted that a saturated portion of the second image data is not used for this correction.

As seen from the foregoing, in accordance with the light distribution characteristic measurement method of the present embodiment, a group of image data taken through the first measurement is used as a basic data and, from a group of image data taken through the second measurement with a higher imaging sensitivity, pixel values (non-saturated portion) having effective information are successively extracted and embedded in the basic image data. Namely, imaging under the second imaging condition is done with an imaging sensitivity which is set higher than an imaging sensitivity with which imaging is done under the first imaging condition. Then, in the case where information about a region of interest in image data selected from the second image data group (second image information) indicates saturation of a pixel value, information processor 100 preferentially uses information about the region of interest in image data selected from the first image data group (first image information). Otherwise, information processor 100 preferentially uses the second image information.

When the pixel value is embedded, an increase in the pixel value due to enhancing imaging sensitivity is normalized to be adapted to the imaging condition for the basic image data. Namely, depending on a difference in imaging sensitivity between the first imaging condition and the second imaging condition, information processor 100 adjusts the level of one of the information about a region of interest in image data selected from the first image data group (first image information) and the information about the region of interest in image data selected from the second image data group (second image information). In the above-described example, the image data group (first image data group) taken through the first measurement is used as a base and therefore, the level of the second image data group is corrected to be adapted to the pixel value of the first image data group. On the contrary, however, the level of the first image data group may be corrected.

Particularly in the case where a CCD image sensor is employed for camera 10 and saturation occurs at a certain position of a pixel, a phenomenon called blooming that affects pixels adjacent to the aforementioned pixel occurs. It is therefore preferable not to embed, in the base image data, a pixel value in the region affected by such blooming.

The process as described above can be repeated for all pixels to finally obtain image data with an improved S/N ratio. This image data (luminance image) with the improved S/N ratio is used to calculate the illuminance and the luminous intensity. Namely, in accordance with the light distribution characteristic measurement method of the present embodiment, measurement can be performed multiple times under different imaging conditions to thereby measure, with a high sensitivity, the luminance (condition of light) of a light source even when the light source has a significantly varying luminance. Accordingly, the illuminance of a dark portion can also be measured with a stable precision.

According to the above-described process procedure, the image data obtained under the condition where the imaging sensitivity is relatively lower is used as the base data. Alternatively, the image data obtained under the condition where the imaging sensitivity is relatively higher may be used as the base data and a similar process may accordingly be performed.

Moreover, regarding the above-described process procedure, the above description is of the process in which a pixel value of a certain pixel in the base data is replaced with a pixel value of a pixel at the corresponding position in the correction data. Alternatively, a new pixel value may be determined from respective pixel values of corresponding pixels in the base data and the correction data.

D. OVERVIEW OF ILLUMINANCE CALCULATION PROCESS

Figure 9:
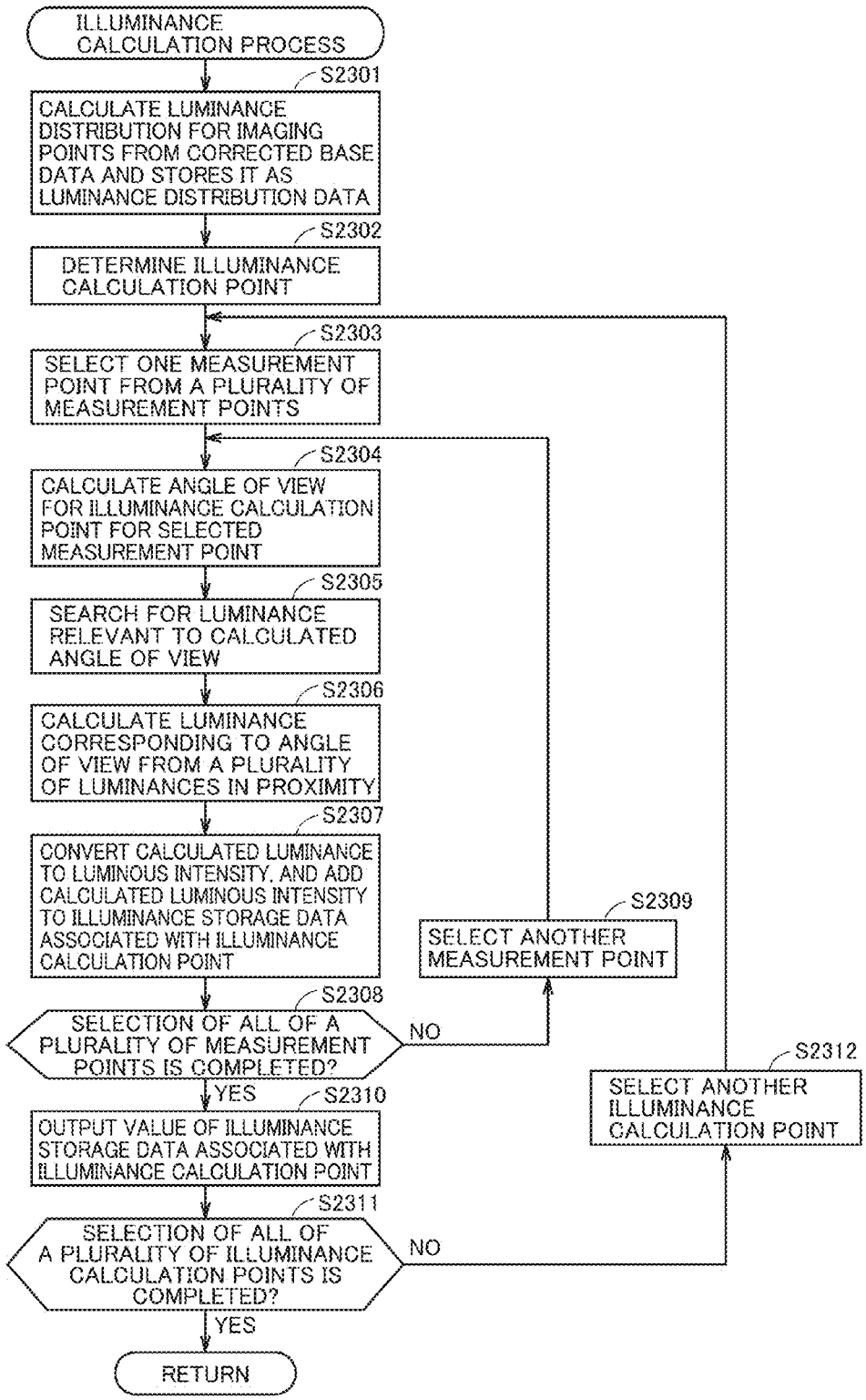
FIG. 9 is a flowchart showing a process procedure of an illuminance calculation process shown in step S23 in FIG. 7.

Next, an illuminance calculation process (step S23 in FIG. 7) will be described. FIG. 9 is a flowchart showing a process procedure of the illuminance calculation process shown in step S23 in FIG. 7. Each step shown in FIG. 9 is mainly performed by CPU 101 of information processor 100.

Referring to FIG. 9, CPU 101 of information processor 100 calculates a luminance distribution for corresponding imaging points, from the corrected base data (first image data group), and stores the calculated luminance distribution as luminance distribution data (step S2301).

Figure 10:
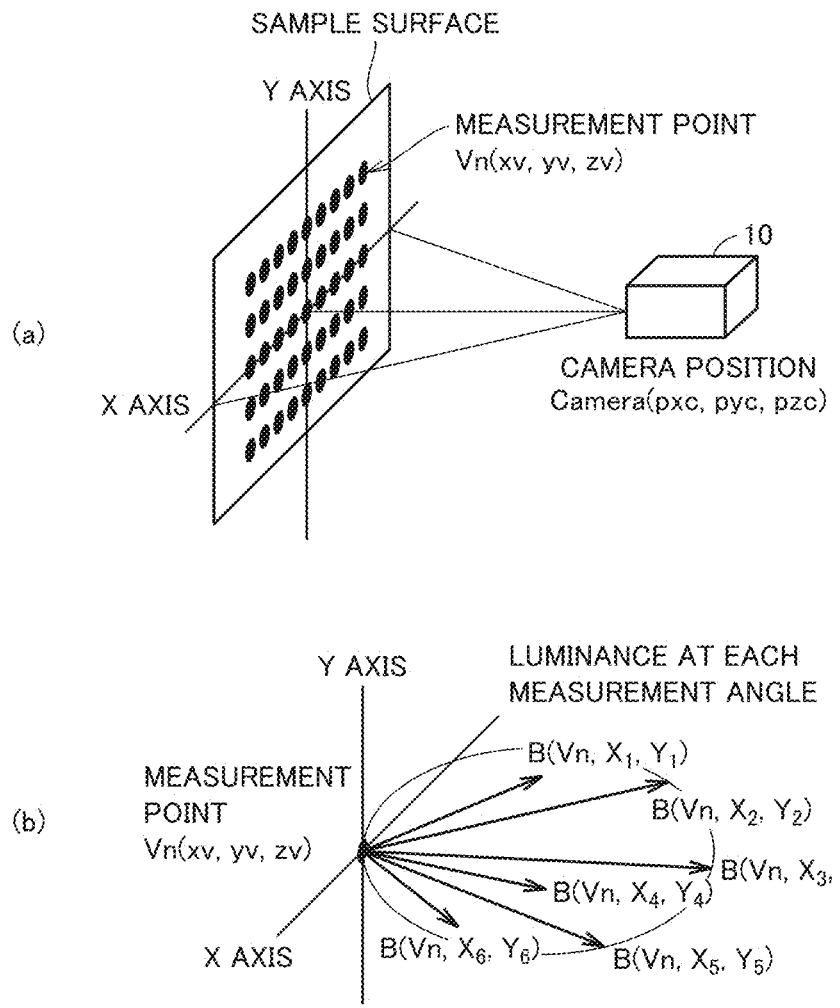
FIG. 10 is a diagram for illustrating an operation in the step of storing luminance distribution data (step S2301) in FIG. 9.
Figure 11:
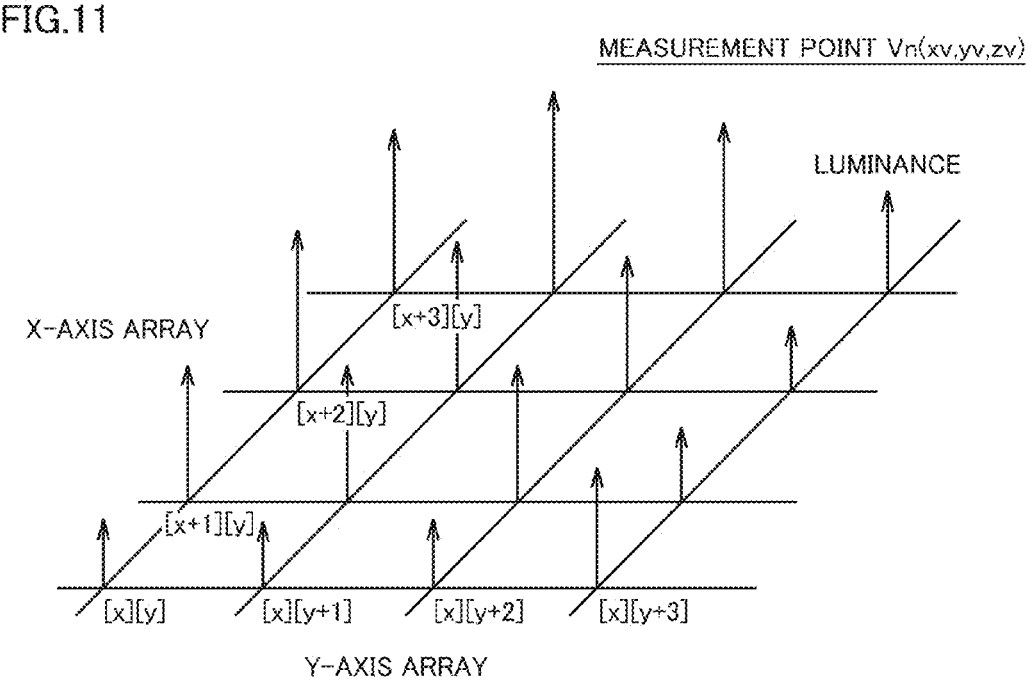
FIG. 11 is a diagram for illustrating an operation in the step of storing luminance distribution data (step S2301) in FIG. 9.

FIGS. 10 and 11 are each a diagram for illustrating an operation in the step of storing the luminance distribution data (step S2301) in FIG. 9. As shown by (a) of FIG. 10, from one or a plurality of corrected base data, the luminance for each measurement angle is obtained for each measurement point Vn (xv, yv, zv). Each measurement point Vn is identified as coordinates in image data (a set of pixel values on the two-dimensional sensor) taken by camera 10. A pixel value/values of one or a plurality of pixels including measurement point Vn is/are used to calculate the luminance for each measurement angle. Preferably, an average integrated value of the brightness of a taken image in a predetermined area defined with respect to measurement point Vn is used. Moreover, from the positional relation (relative relation) between the position of camera 10 (camera position Camera (pxc, pyc, pzc)) and each measurement point Vn (xv, yv, zv), the measurement angle is determined.

Finally, for each measurement point Vn (xv, yv, zv), luminance B (Vn, X1, Y1), B (Vn, X2, Y2), B (Vn, X3, Y3), . . . for each measurement angle is calculated.

For example, the array structure as shown in FIG. 11 is used to store each luminance associated with the measurement angle. Each luminance stored in this array structure is an element of the luminance distribution data. Depending on the light distribution characteristic of sample 2, the magnitudes of the luminance at different measurement angles may be different from each other. The array structure shown in FIG. 11 is not given by way of limitation, and any data storage method may be employed.

Referring again to FIG. 9, CPU 101 performs a process of determining an illuminance calculation point (step S2302). In this process of determining an illuminance calculation point, CPU 101 sets any region for which the illuminance is to be calculated, determines one point included in the set region as an illuminance calculation point, and obtains the spatial coordinates of this point.

Figure 12:
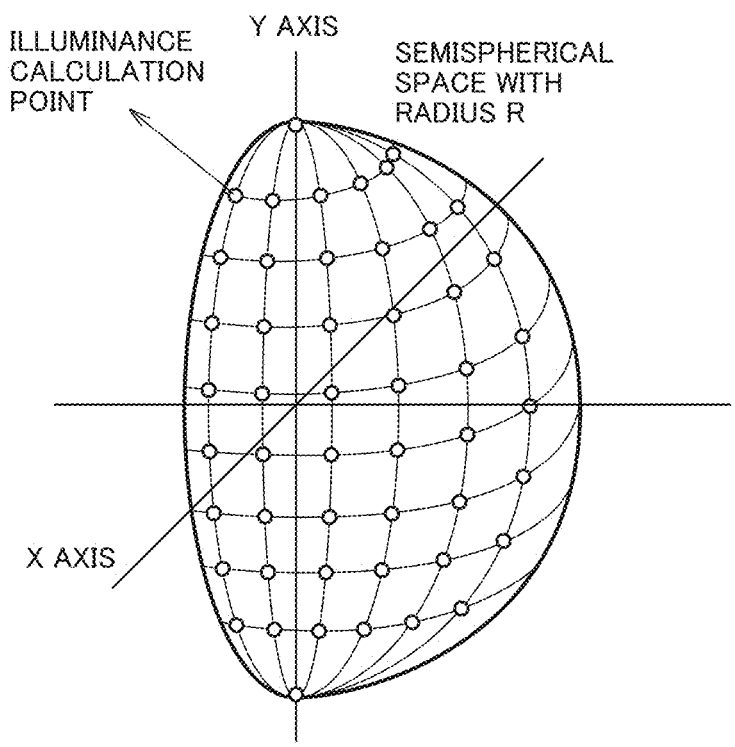
FIG. 12 is a diagram for illustrating the step of determining an illuminance calculation point (step S2302) in FIG. 9.

FIG. 12 is a diagram for illustrating the step of determining an illuminance calculation point (step S2302) in FIG. 9. The illuminance calculation point may be defined by means of any coordinate system. For example, the XY coordinate system, the $\alpha\beta$ coordinate system, the $\phi\theta$ coordinate system, or the like may be used. FIG. 12 defines a region for which the illuminance is to be calculated in the XY coordinate system, and shows an example of illuminance calculation points set on the region. The XY coordinate system shown in FIG. 12 defines the illuminance calculation points which are set with respect to the axial center defined as the origin (0, 0, 0) of the spatial coordinate system.

Referring again to FIG. 9, CPU 101 selects any one measurement point from a plurality of measurement points for which the luminance distribution data has been obtained (step S2303), and calculates an angle of view for the illuminance calculation point for the selected measurement point (step S2304).

Figure 13:
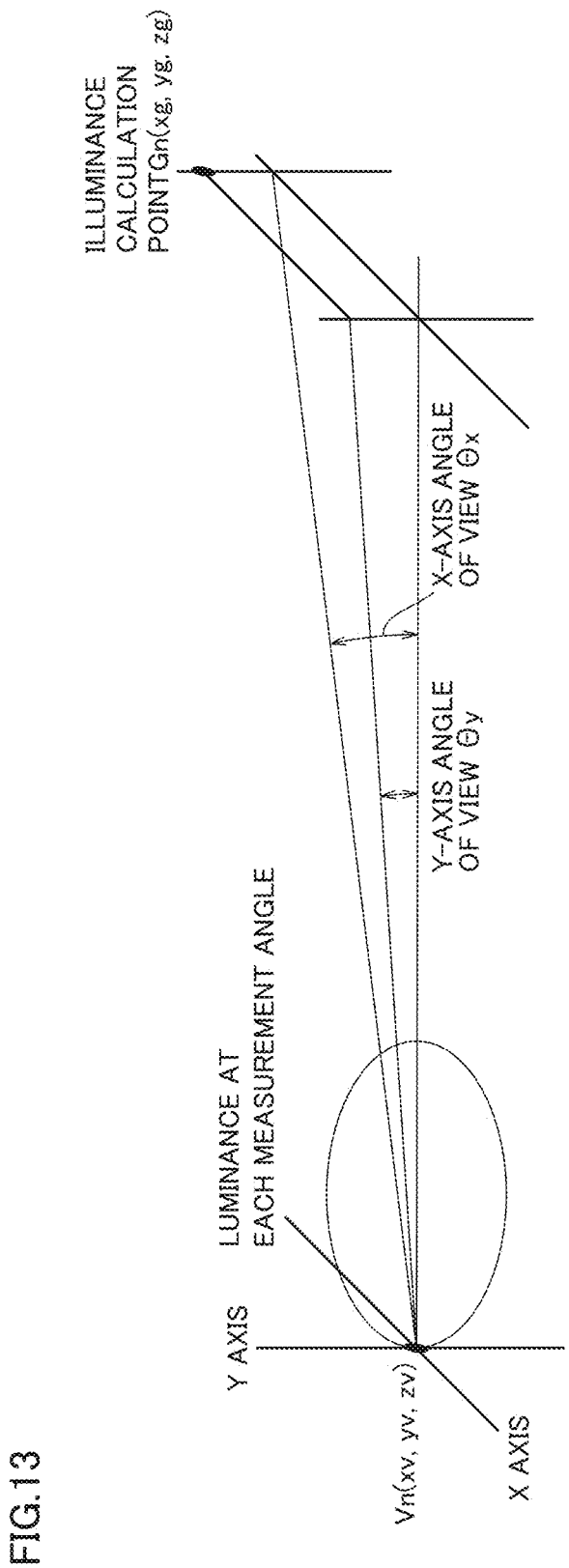
FIG. 13 is a diagram for illustrating the step of calculating an angle of view with respect to an illuminance calculation point (step S2304) in FIG. 9.

FIG. 13 is a diagram for illustrating the step of calculating an angle of view for an illuminance calculation point (step S2304) in FIG. 9. Referring to FIG. 13, it is supposed that the coordinate values of selected measurement point Vn are (xv, yv, zv), and the coordinate values of illuminance calculation point Gn are (xg, yg, zg). From the relation between these coordinate values, angles of view $\theta x$, $\theta y$ for illuminance calculation point Gn for selected measurement point Vn are each calculated. Angles of view $\theta x$, $\theta y$ are angles for a luminous flux emitted from selected measurement point Vn to reach illuminance calculation point Gn.

Referring again to FIG. 9, CPU 101 searches the luminance distribution data associated with the selected measurement point for the illuminance associated with the angles of view calculated in step S2304 (step S2305).

Figure 14:
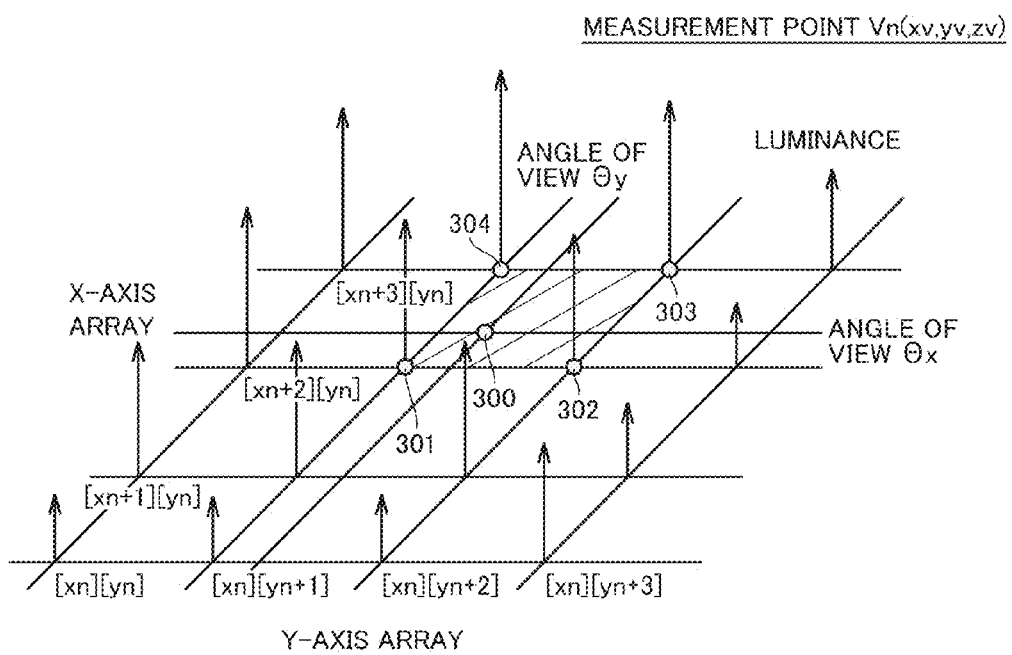
FIG. 14 is a diagram for illustrating the step of searching for a luminance associated with an angle of view (step S2305) in FIG. 9.

FIG. 14 is a diagram for illustrating the step of searching for the luminance associated with the angles of view (step S2305) in FIG. 9. As shown in FIG. 14, for each measurement point Vn (xv, yv, zv), the luminances for respective measurement angles are calculated. However, since the measurement angles are discretely determined, the luminance associated with the angles of view calculated in step S2304 are not stored in many cases. Therefore, the array structure as shown in FIG. 14 is used, and the luminance corresponding to angles of view proximate to calculated angles of view $\theta x$, $\theta y$ is used to calculate the luminance corresponding to angles of view $\theta x$, $\theta y$. In the example shown in FIG. 14, four storage addresses (array positions 301, 302, 303, 304) in proximity to an intersection 300 of angle of view $\theta x$ and angle of view $\theta y$ on the two-dimensional array are extracted.

Referring again to FIG. 9, CPU 101 calculates the luminance corresponding to the calculated angles of view, from a plurality of luminances in proximity to the angles of view (step S2306), converts the calculated luminance by means of a luminous intensity correction coefficient, and adds the calculated luminous intensity to the illuminance storage data associated with the selected illuminance calculation point (step S2307).

Then, CPU 101 determines whether or not all measurement points for which the luminance distribution data is obtained have been selected (step S2308). When any of the plurality of measurement points has not been selected (NO in step S2308), CPU 101 selects another measurement point (step S2309), and performs the process from step S2304.

In contrast, when all of the plurality of measurement points have been selected (YES in step S2308), CPU 101 outputs, as the illuminance at the illuminance calculation point, the value of the illuminance storage data associated with the selected illuminance calculation point (step S2310).

Namely, for one illuminance calculation point, the luminances (or luminous intensities) obtained through conversion) from all measurement points are summed up. When the summation of the luminances (or luminous intensities) for all measurement points is completed, the result of summation is the illuminance at the corresponding illuminance calculation point.

This series of operations is performed for each of other illuminance calculation points. Namely, from a region for which the illuminance is to be calculated, illuminance calculation points are successively specified, and the above-described operations are repeatedly performed. More specifically, CPU 101 determines whether or not selection of all of a plurality of illuminance calculation points included in the region for which the illuminance is to be calculated is completed (step S2311). When selection of any of the plurality of illuminance calculation points is not completed (NO in step S2311), CPU 101 selects another illuminance calculation point (step S2312), and performs the process from step S2304.

In contrast, when selection of all of the plurality of illuminance calculation points is completed (YES in step S2311), the illuminance calculation process (step S23 in FIG. 7) is ended.

E. EXAMPLE RESULT OF MEASUREMENT

Next, an example result of measurement obtained in accordance with the light distribution characteristic measurement method according to the present embodiment will be illustrated.

Figure 15:
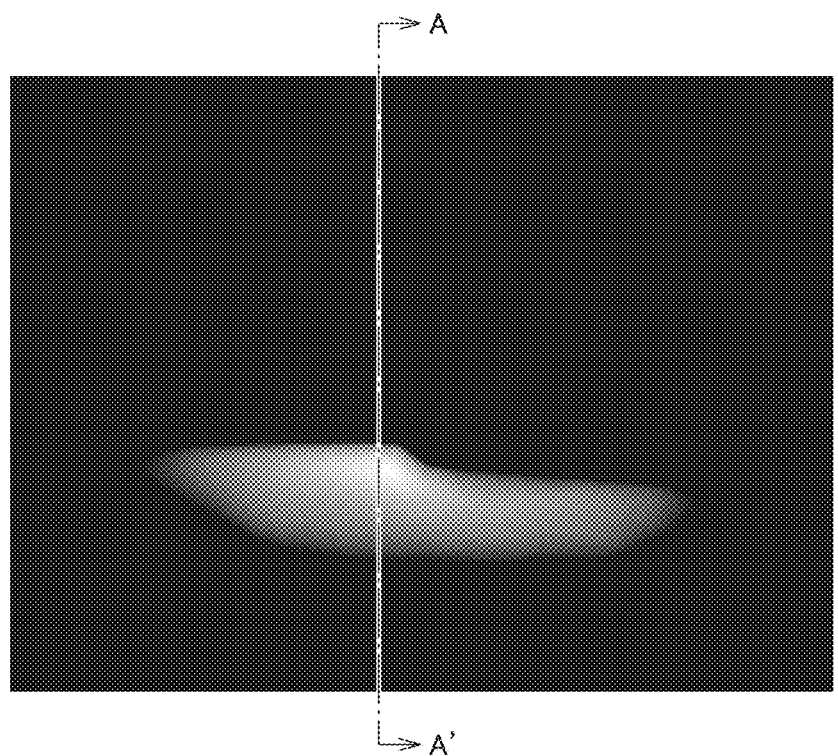
FIG. 15 is a diagram showing a result of imaging of an illuminance distribution obtained in accordance with a light distribution characteristic measurement method according to the present embodiment.
Figure 16:
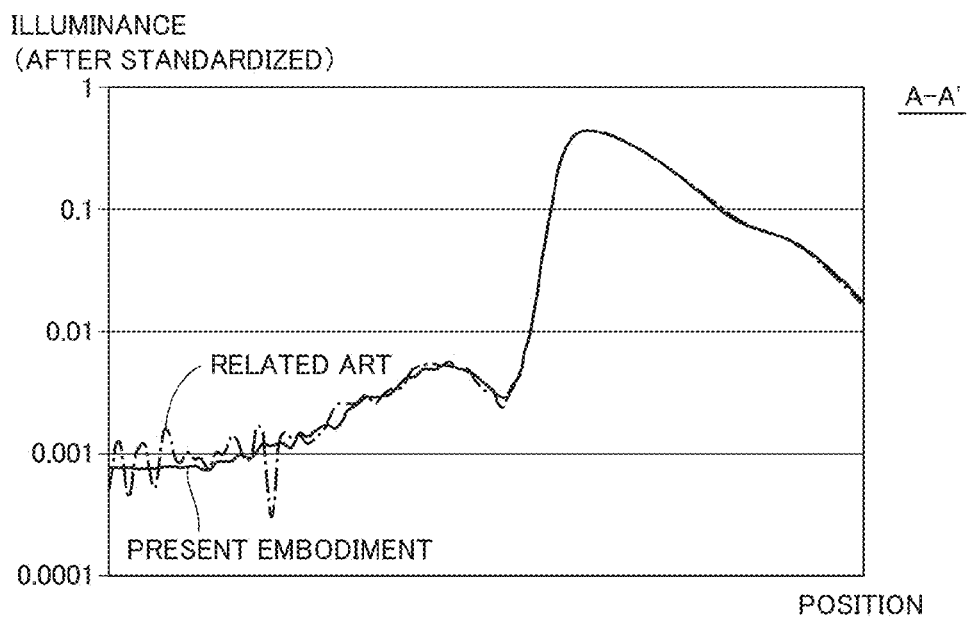
FIG. 16 is a diagram showing an illuminance in a cross section along A-A' of the imaged illuminance distribution shown in FIG. 15.

FIG. 15 is a diagram showing a result of imaging of an illuminance distribution obtained in accordance with the light distribution characteristic measurement method according to the present embodiment. FIG. 16 is a diagram showing an illuminance in a cross section along A-A' of the imaged illuminance distribution shown in FIG. 15.

For a sample where a peak of the illuminance is present in a specific range as shown in FIG. 15, the light distribution characteristic measurement method according to the present embodiment can stably calculate the illuminance of even a non-light-emitting portion (dark portion) as shown in FIG. 16. FIG. 16 shows, for the same sample, a measurement result of the light distribution characteristic measurement method according to the present embodiment as compared with a measurement result of a light distribution characteristic measurement method according to a related art. Regarding the related art, the correction process as described above is not performed. It is seen from the result of comparison shown in FIG. 16 that the present embodiment can stably calculate the illuminance even for the non-light-emitting portion (dark portion) for which the related art cannot stably calculate the illuminance.

F. MODIFICATION

Regarding the above-described embodiment, the description is of an example of the process of performing imaging multiple times under different imaging conditions for the same imaging point. It should be noted that it is unnecessary to perform imaging multiple times for the same imaging point. Namely, imaging may be performed under a certain condition for an imaging point, and imaging may be performed under another condition for another imaging point (which should be located near the former imaging point). Imaging can be performed for a greater number of imaging points to thereby set measurement angles at smaller intervals for sample 2. Further, since overlapping of information (redundant information) due to imaging repeated for the same imaging point can be eliminated, the measurement precision and the measurement efficiency can be enhanced.

Figure 17:
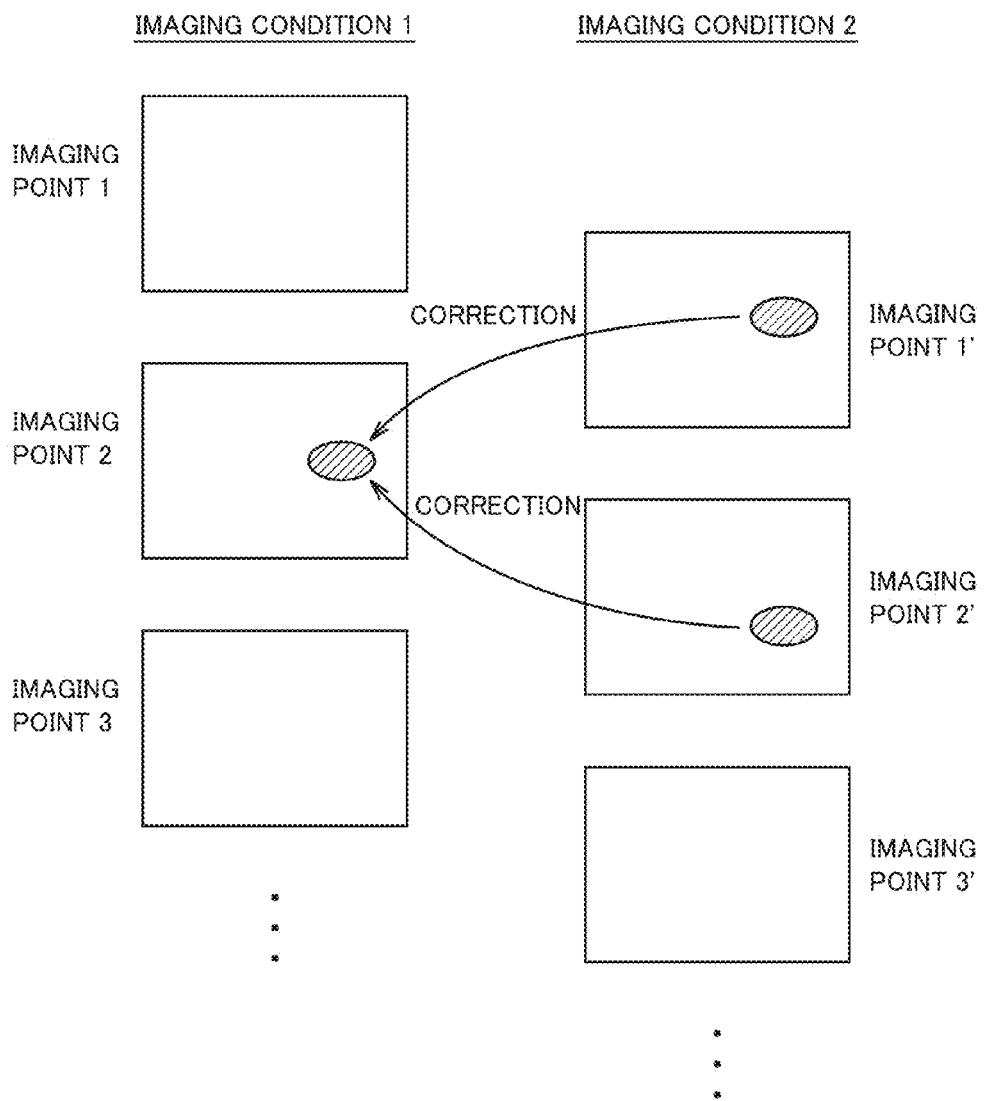
FIG. 17 is a diagram for illustrating an overview of a light distribution characteristic measurement method according to a modification of the present embodiment.

FIG. 17 is a diagram for illustrating an overview of a light distribution characteristic measurement method according to a modification of the present embodiment. As shown in FIG. 17, regarding the light distribution characteristic measurement method according to the modification of the present embodiment, sample 2 is imaged at imaging point 1, imaging point 2, imaging point 3, . . . under imaging condition 1, and sample 2 is also imaged at imaging point 1', imaging point 2', imaging point 3', . . . under imaging condition 2. For respective image data obtained through these imaging operations, a correction process is performed between image data located in proximity to each other to thereby generate image data including a greater amount of information.

Typically, when the imaging condition is changed and imaging of sample 2 is to be repeated, the start angle, the end angle, the distance of movement (angular change) and the like for rotationally moving camera 10 by goniometer 200 can be changed for each imaging condition to substantially enhance the imaging sensitivity of camera 10, and obtain a greater amount of angular information. Accordingly, the spatial resolution in the illuminance calculation process can be enhanced. In the case where the imaging point is changed, the start angle, the end angle, and the angular distance may be changed with respect to only one of or both the X axis and Y axis. Both the X-axis value and the Y-axis value can be changed to further enhance the spatial resolution in the illuminance calculation process.

Figure 18:
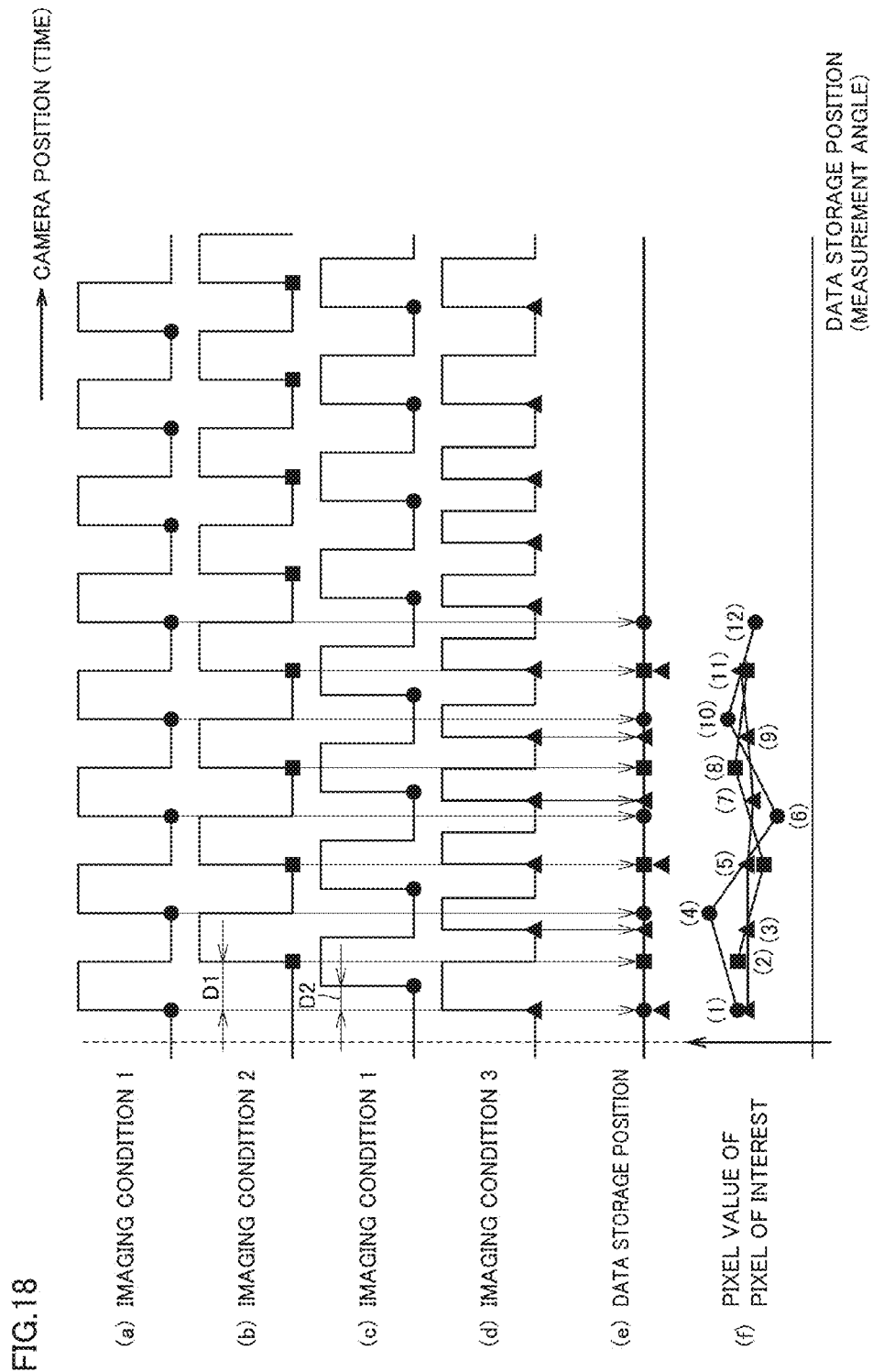
FIG. 18 is a diagram showing an example of a measurement operation for the light distribution characteristic measurement method according to the modification of the present embodiment.

FIG. 18 is a diagram showing an example of a measurement operation for the light distribution characteristic measurement method according to the modification of the present embodiment. As to the example of measurement shown in FIG. 18, it is supposed that the imaging sensitivity of camera 10 increases in the order of imaging condition 1→imaging condition 2 imaging condition 3. FIG. 18 shows an example in the case where sample 2 is imaged four times corresponding to (a) to (d). These imaging operations are different from each other in terms of the start angle and the distance of movement for rotationally moving camera 10. Namely, under imaging condition 2 ((b) of FIG. 18), movement is started at the position delayed by D1 relative to the start position under imaging condition 1 ((a) of FIG. 18). Under second imaging condition 1 ((c) of FIG. 18), movement is started at the position delayed by D2 relative to the start position under the first imaging condition 1 ((a) of FIG. 18).

(e) of FIG. 18 shows respective positions of imaging points when the image data obtained through respective imaging operations of (a) to (d) in FIG. 18 are stored. As described above, each image data is stored in association with the position of camera 10 (coordinates of the imaging point) when the image data is taken. Namely, information about the image data is stored in association with the measurement angle at which sample 2 is imaged. The start angle and the distance of movement for rotationally moving camera 10 are varied to thereby increase the imaging points as compared with the case where the sample is imaged under the same imaging condition. Regarding the example shown in FIG. 18, there are the case where a plurality of image data can be obtained for a certain imaging point (imaging points (1), (5), (11) of (f) of FIG. 18), and the case where only single image data can be obtained for a certain imaging point (imaging points (2), (3), (4), . . . of (f) of FIG. 18), depending on the start angle and the distance of movement.

In the case where a plurality of image data can be obtained for a certain imaging point, the image data obtained under an imaging condition with a higher imaging sensitivity can preferentially be used (embedded in image data under an imaging condition with a lower imaging sensitivity).

Alternatively, rather than preferentially using one image data, information of a plurality of image data may be used. Namely, respective pixel values of corresponding plurality of image data can be averaged to thereby obtain image data with a higher precision. The averaging can be achieved not only in the case where multiple image data are available for the same imaging point, but also in the case where image data obtained for an imaging point in proximity to a certain imaging point is used.

(1) The Case Where a Plurality of Image Data are Available for a Certain Imaging Point In the case where a plurality of image data are available for the same imaging point, a pixel value of image data with a lower imaging sensitivity is multiplied by a weight (coefficient of contribution) and then the image data are averaged. The weight is a coefficient depending on a difference in sensitivity. For example, the pixel value at imaging point (1) shown by (f) of FIG. 18 can be calculated in accordance with the following formula.

pixel value at imaging point(1)={(*a*) pixel value of image data taken under imaging condition 1×weight α1+(*d*) pixel value of image data taken under imaging condition 3}/2

Thus, information processor 100 determines the average of information (first image information) of a region of interest in image data selected from a first image data group, and information (second image information) of the region of interest in image data selected from a second image data group, to thereby determine corrected image information corresponding to each imaging point (relative position of interest).

(2) The Case Where a Plurality of Image Data are not Available for a Certain Imaging Point In the case where image data for different imaging points are available, other image data obtained for imaging points in proximity to an imaging point of interest are extracted, and interpolation is performed using the extracted image data. As a technique for the interpolation, any of a variety of methods such as linear interpolation and spline interpolation can be employed.

In the case where the linear interpolation is employed for the pixel value of imaging point (2) shown by (f) of FIG. 18, for example, information about the image data of the imaging point of interest can be calculated through the following procedure.

For imaging point (2), in the case where the pixel value under imaging condition 1 is calculated through interpolation, the pixel values corresponding to preceding imaging point (1) and subsequent imaging point (4) under imaging condition 1 are used. The line connecting imaging point (1) and imaging point (4) is defined as Y=aX+b, where coefficients a and b can be calculated in accordance with the following formula. It should be noted that Y represents a pixel value of a pixel of interest, and X represents a measurement angle.

coefficient *a*=(pixel value(4) of image data taken under imaging condition 1−pixel value(1) of image data taken under imaging condition 1)/(measurement angle of imaging point corresponding to pixel value(4)−measurement angle of imaging point corresponding to pixel value (1))

coefficient *b*=pixel value(1) of image data taken under imaging condition 1−coefficient *a*×measurement angle of imaging point corresponding to pixel value(1)

The calculated coefficient a and coefficient b can be used and measurement angle X of imaging point (2) is substituted into Y=aX+b to thereby calculate the pixel value of the pixel of interest for imaging point (2) under imaging condition 1.

In this way, information processor 100 calculates image information corresponding to a certain imaging point (relative position of interest), from a plurality of image data taken at different positions from the certain imaging point.

For a plurality of image data taken under different imaging conditions, one of the above-described processes can be selectively executed depending on whether image data is for the same imaging point or not, to thereby obtain an image data group with a high measurement precision. Namely, information about an imaging point (measurement angle) is effectively used to enable image data to be obtained stably.

In accordance with the light distribution characteristic measurement method according to the modification of the present embodiment, the imaging point (measurement angle) can be successively changed to image sample 2 at more imaging points, to thereby obtain a greater amount of information. For the obtained information (image data), interpolation or the like can be performed to thereby stably obtain image data at each imaging point that is necessary for calculating the light distribution characteristic (illuminance distribution or luminous intensity distribution).

Regarding the above-described example of measurement, the description is given of the case where both the imaging condition (imaging sensitivity) and the imaging point are changed for performing imaging. Alternatively, under the constant imaging condition, the start angle, the end angle, the distance of movement (angular change) and the like for rotationally moving camera 10 by goniometer 200 may be changed. In this case as well, a greater amount of image information can be obtained, and therefore, the spatial resolution in the illuminance calculation can be improved.

While the above description is of an example process in which a target pixel value is multiplied by a weight (coefficient of contribution) and then averaging is performed, the weight may be a value determined in advance depending on a difference in sensitivity, the optical characteristic of the camera, and the like, or may be changed dynamically depending on the situation. For example, the weight (coefficient of contribution) may be determined depending on a repetitive standard deviation of the results obtained through measurement which is done multiple times, for example. Namely, it is preferable that the coefficient of contribution is set smaller as the deviation is larger (namely the dispersion of the results is larger).

Moreover, regarding the above-described process example, the measurement angle representing the imaging point is used as a variable parameter. Alternatively, the time elapsed from the start of measurement may be used as a variable parameter. In the case where the exposure time of camera 10 is sufficiently shorter than the measurement time interval, the measurement at time intervals can be performed with a higher precision (higher resolution).

G. ADVANTAGES

In the case where a light source with a strong directivity such as headlight of an automobile is to be measured, the imaging sensitivity is appropriately adjusted depending on the exposure time, the F-number of a camera, the gain, whether a neutral density filter is present or not, and the type of the neutral density filter, for example, so that the brightest portion in an imaged range can appropriately be imaged. In the case, however, where the imaging sensitivity is adapted to the brightest portion, a sufficient imaging sensitivity cannot be achieved for a dark portion, which may result in the case where the resultant data may not have a desired level of the S/N ratio.

In contrast, in accordance with the light distribution characteristic measurement method according to the present embodiment, typically measurement can be performed twice or more for image data obtained under an imaging condition adapted to a brighter portion and image data obtained under an imaging condition adapted to a darker portion, to thereby obtain necessary image information and stably calculate the light distribution characteristic from the image information. Namely, the measurement method as described above can be employed to improve the S/N ratio of a dark portion in image data, and thereby calculate a stable value even for the illuminance or luminous intensity for a dark portion. As a result, the light distribution characteristic of a light source can be measured with a higher precision even when the light source has a strong directivity.

From the foregoing description, other advantages of the light distribution characteristic measurement apparatus and the light distribution characteristic measurement method according to the present embodiment will become apparent.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A light distribution characteristic measurement apparatus for measuring a light distribution characteristic of a light source, comprising:
    an imaging unit disposed at a predetermined distance from the light source;
    a movement mechanism configured to successively change a positional relation of the imaging unit with respect to the light source, while keeping the distance between the light source and the imaging unit; and
    a processing module configured to calculate the light distribution characteristic of the light source, based on a plurality of image data taken by the imaging unit and a relative position of the imaging unit with respect to the light source when each of the plurality of image data is taken,
    the processing module being configured to
        obtain a plurality of image data taken under a first imaging condition and a plurality of image data taken under a second imaging condition different from the first imaging condition,
        determine corrected image information corresponding to a relative position of interest, from first image information corresponding to the relative position of interest included in the image data taken under the first imaging condition and second image information corresponding to the relative position of interest included in the image data taken under the second imaging condition, and
        calculate the light distribution characteristic based on the corrected image information corresponding to the relative position of interest, the light distribution characteristic including information about the luminance for each illumination angle at each point on the light source.

2. The light distribution characteristic measurement apparatus according to claim 1, wherein
    imaging under the second imaging condition is performed with a higher imaging sensitivity than an imaging sensitivity with which imaging is performed under the first imaging condition, and
    the processing module is configured to preferentially use the first image information when the second image information indicates saturation of a pixel value, and otherwise preferentially use the second image information.

3. The light distribution characteristic measurement apparatus according to claim 1, wherein the processing module is configured to adjust a level of one of the first image information and the second image information, depending on a difference in imaging sensitivity between the first imaging condition and the second imaging condition.

4. The light distribution characteristic measurement apparatus according to claim 1, wherein the processing module is configured to determine the corrected image information corresponding to the relative position of interest, by averaging the first image information and the second image information.

5. The light distribution characteristic measurement apparatus according to claim 1, wherein the processing module is configured to calculate image information corresponding to the relative position of interest, from a plurality of image data taken at different positions from the relative position of interest.

6. A light distribution characteristic measurement method of measuring a light distribution characteristic of a light source, comprising the steps of:
    successively changing a positional relation of an imaging unit with respect to the light source, while keeping a distance between the light source and the imaging unit; and
    calculating the light distribution characteristic of the light source, based on a plurality of image data taken by the imaging unit and a relative position of the imaging unit with respect to the light source when each of the plurality of image data is taken,
    the step of calculating the light distribution characteristic of the light source including the steps of:
        obtaining a plurality of image data taken under a first imaging condition and a plurality of image data taken under a second imaging condition different from the first imaging condition;

determining corrected image information corresponding to a relative position of interest, from first image information corresponding to the relative position of interest included in the image data taken under the first imaging condition and second image information corresponding to the relative position of interest included in the image data taken under the second imaging condition; and calculating the light distribution characteristic based on the corrected image information corresponding to the relative position of interest, the light distribution characteristic including information about the luminance for each illumination angle at each point on the light source.

7. The light distribution characteristic measurement method according to claim 6, wherein imaging under the second imaging condition is performed with a higher imaging sensitivity than an imaging sensitivity with which imaging is performed under the first imaging condition, and the step of calculating the light distribution characteristic of the light source includes the step of preferentially using the first image information when the second image information indicates saturation of a pixel value, and otherwise preferentially using the second image information.

8. The light distribution characteristic measurement method according to claim 6, wherein the step of calculating the light distribution characteristic of the light source includes the step of adjusting a level of one of the first image information and the second image information, depending on a difference in imaging sensitivity between the first imaging condition and the second imaging condition.

9. The light distribution characteristic measurement method according to claim 6, wherein the step of calculating the light distribution characteristic of the light source includes the step of determining the corrected image information corresponding to the relative position of interest, by averaging the first image information and the second image information.

10. The light distribution characteristic measurement method according to claim 6, wherein the step of calculating the light distribution characteristic of the light source includes the step of calculating image information corresponding to the relative position of interest, from a plurality of image data taken at different positions from the relative position of interest.

* * * * *